United States Patent
Noh et al.

(10) Patent No.: US 9,316,402 B2
(45) Date of Patent: Apr. 19, 2016

(54) HEAT PUMP

(75) Inventors: Jinhee Noh, Changwon-si (KR);
Woohyun Paik, Changwon-si (KR);
Heewoong Park, Changwon-si (KR);
Noma Park, Changwon-si (KR);
Hwanjong Choi, Changwon-si (KR);
Samchul Ha, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 1132 days.

(21) Appl. No.: 13/211,490

(22) Filed: Aug. 17, 2011

(65) Prior Publication Data

US 2012/0043390 A1 Feb. 23, 2012

(30) Foreign Application Priority Data

Aug. 17, 2010 (KR) .................. 10-2010-0079197

(51) Int. Cl.
| | |
|---|---|
| *F24D 3/02* | (2006.01) |
| *F24D 3/08* | (2006.01) |
| *F24D 3/18* | (2006.01) |
| *F24D 17/02* | (2006.01) |
| *F24D 19/10* | (2006.01) |
| *G05D 23/19* | (2006.01) |
| *F25B 13/00* | (2006.01) |
| *F24H 7/04* | (2006.01) |

(52) U.S. Cl.
CPC .. *F24D 3/08* (2013.01); *F24D 3/18* (2013.01);
*F24D 17/02* (2013.01); *F24D 19/1063*
(2013.01); *F24D 19/1072* (2013.01); *F24D
19/1081* (2013.01); *G05D 23/1923* (2013.01);
*Y02B 30/12* (2013.01)

(58) Field of Classification Search
CPC .... Y02B 10/70; Y02B 30/126; Y02B 30/123;
Y02B 30/12; F25B 13/00; F24D 3/08; F24D
3/00; F24D 3/02; F24D 19/1063; F24D
19/1081; F24D 19/1072; F24D 17/02; F23N
2014/04; F24H 1/52; F24H 4/04; F23D 3/18;
G05D 23/1923
USPC ........... 237/2 B, 8 A, 8 C, 2 A, 16, 19, 59, 61
See application file for complete search history.

(56) References Cited

U.S. PATENT DOCUMENTS

| | | | | | |
|---|---|---|---|---|---|
| 3,823,572 | A | * | 7/1974 | Cochran, Jr. .............. | F24F 5/00 165/207 |
| 4,123,003 | A | * | 10/1978 | Winston ....................... | 165/48.2 |
| 4,213,563 | A | * | 7/1980 | van Kuijk ..................... | 237/2 B |
| 4,287,723 | A | * | 9/1981 | Dosmond .................... | 62/238.6 |

(Continued)

FOREIGN PATENT DOCUMENTS

| | | | | | |
|---|---|---|---|---|---|
| JP | 54109642 | A | * | 8/1979 | ................ F24H 9/00 |
| JP | 57192735 | A | | 11/1982 | |

(Continued)

OTHER PUBLICATIONS

Korean Patent #KR-2005-112702-A; Dec. 1, 2005.*

(Continued)

*Primary Examiner* — Gregory Huson
*Assistant Examiner* — Daniel E Namay
(74) *Attorney, Agent, or Firm* — Ked & Associates LLP

(57) ABSTRACT

A heat pump including a boiler is disclosed. The heat pump may include a quick-hot-water-supply tank and the boiler, which may be operated selectively based on a temperature of external air or an electric power rate per unit heat quantity.

17 Claims, 9 Drawing Sheets

(56) References Cited

U.S. PATENT DOCUMENTS

| | | | | |
|---|---|---|---|---|
| 4,315,597 | A * | 2/1982 | Garraffa, Jr. | 237/2 B |
| 4,389,853 | A * | 6/1983 | Hile | 62/89 |
| 4,399,862 | A * | 8/1983 | Hile | 165/253 |
| 4,452,620 | A * | 6/1984 | Dosmond | 62/238.6 |
| 4,476,920 | A * | 10/1984 | Drucker et al. | 165/242 |
| 4,524,909 | A * | 6/1985 | Persson | 237/2 B |
| 4,527,618 | A * | 7/1985 | Fyfe et al. | 126/635 |
| 5,095,715 | A * | 3/1992 | Dudley | 62/228.4 |
| 5,109,677 | A * | 5/1992 | Phillippe | 62/160 |
| 5,192,022 | A * | 3/1993 | Swenson | 237/2 B |
| 5,727,396 | A * | 3/1998 | Boyd et al. | 62/323.1 |
| 6,089,221 | A * | 7/2000 | Mano | F24H 9/0036 126/110 B |
| 6,347,527 | B1 * | 2/2002 | Bailey et al. | 62/238.7 |
| 6,409,090 | B1 * | 6/2002 | Gilvar | G05D 23/1923 122/448.1 |
| 6,668,572 | B1 * | 12/2003 | Seo et al. | 62/238.6 |
| 6,735,969 | B2 * | 5/2004 | Kasagi et al. | 62/238.7 |
| 6,769,481 | B2 * | 8/2004 | Yoshimura et al. | 165/240 |
| 6,837,443 | B2 * | 1/2005 | Saitoh et al. | 237/2 B |
| 6,874,694 | B2 * | 4/2005 | Saitoh et al. | 237/2 B |
| 7,234,646 | B2 * | 6/2007 | Saitoh et al. | 237/2 B |
| 7,669,647 | B2 * | 3/2010 | Tsubone et al. | 165/202 |
| 8,245,948 | B2 * | 8/2012 | Cho et al. | 237/12.1 |
| 8,346,396 | B2 * | 1/2013 | Amundson et al. | 700/276 |
| 8,640,475 | B2 * | 2/2014 | Park et al. | 62/238.7 |
| 8,768,521 | B2 * | 7/2014 | Amundson et al. | 700/276 |
| 2002/0017107 | A1 * | 2/2002 | Bailey et al. | 62/238.7 |
| 2003/0089493 | A1 * | 5/2003 | Takano et al. | 165/202 |
| 2003/0178498 | A1 * | 9/2003 | Saitoh et al. | 237/2 B |
| 2005/0167516 | A1 * | 8/2005 | Saitoh et al. | 237/2 B |
| 2006/0065750 | A1 * | 3/2006 | Fairless | 236/46 R |
| 2006/0123820 | A1 * | 6/2006 | Kim | F25B 13/00 62/238.7 |
| 2007/0018009 | A1 * | 1/2007 | Choi et al. | 237/12 |
| 2007/0044501 | A1 * | 3/2007 | Schnell et al. | 62/331 |
| 2007/0246555 | A1 * | 10/2007 | Nishimura et al. | 237/2 B |
| 2008/0147465 | A1 * | 6/2008 | Raines et al. | 705/7 |
| 2008/0197206 | A1 * | 8/2008 | Murakami et al. | 237/2 B |
| 2010/0025488 | A1 * | 2/2010 | Park et al. | 237/2 B |
| 2010/0051713 | A1 * | 3/2010 | Back et al. | 237/2 B |
| 2010/0090017 | A1 * | 4/2010 | Naghshineh | 237/2 B |
| 2010/0282434 | A1 * | 11/2010 | Yabuuchi | F24D 11/0235 165/63 |
| 2011/0011943 | A1 * | 1/2011 | Aspeslagh et al. | 237/2 B |
| 2011/0204720 | A1 * | 8/2011 | Ruiz et al. | 307/66 |
| 2011/0259024 | A1 * | 10/2011 | Park et al. | 62/160 |
| 2011/0259025 | A1 * | 10/2011 | Noh et al. | 62/160 |
| 2011/0259027 | A1 * | 10/2011 | Choi et al. | 62/196.1 |
| 2011/0283728 | A1 * | 11/2011 | Furukawa et al. | 62/238.7 |
| 2012/0042673 | A1 * | 2/2012 | Noh et al. | 62/159 |
| 2012/0043390 | A1 * | 2/2012 | Noh et al. | 237/2 A |

FOREIGN PATENT DOCUMENTS

| | | | | |
|---|---|---|---|---|
| JP | 57210242 | A * | 12/1982 | F24H 9/20 |
| JP | 09287821 | A * | 11/1997 | F24H 1/00 |
| JP | 2010032076 | A * | 2/2010 | |
| KR | 10-2005-0068481 | | 7/2005 | |

OTHER PUBLICATIONS

Korean Patent #KR-9301848-B; Mar. 15, 1993.*

* cited by examiner

HEAT PUMP

CROSS-REFERENCE TO RELATED APPLICATION(S)

Pursuant to 35 U.S.C. §119(a), this application claims the benefit of the Patent Korean Application No. 10-2010-0079197, filed on Aug. 17, 2010, which is hereby incorporated by reference as if fully set forth herein.

BACKGROUND

Field

A heat pump is disclosed herein.

BRIEF DESCRIPTION OF THE DRAWINGS

Embodiments will be described in detail with reference to the following drawings in which like reference numerals refer to like elements, and wherein.

DETAILED DESCRIPTION

As follows, examples of embodiments will be described in detail with reference to the accompanying drawings. However, embodiments are not limited to the examples and it may be specified differently. Examples described herewith are provided to deliver a subject matter to people skilled in the art to which the present application pertains sufficiently. Reference will now be made in detail to specific examples illustrated in the accompanying drawings. Wherever possible, the same reference numbers have been used throughout the drawings to refer to the same or like parts.

In general, a heat pump refers to a cooling/heating device that changes a low temperature heat source into a high temperature heat source and vice versa using heat or condensation heat of a refrigerant as a transport. The heat pump may include an outdoor unit or device having a compressor and an outdoor heat exchanger, and an indoor unit or device having an expansion valve and an indoor heat exchanger.

When the heat pump is used for heating a room or for supplying hot-water quickly, the heat pump may replace fossil fuel. However, if the temperature of external air decreases, heating efficiency might deteriorate drastically or sufficient heating or quick-hot-water-supply might not be provided in a case in which the heat pump is used as a heating source for heating or quick-hot-water-supply. As a result, the heat pump often alone cannot provide sufficient heating or quick-hot-water-supply.

Also, the heat pump and a boiler may be used together for heating or quick-hot-water-supply. In this case, when a power rate or gas rate per unit heat quantity is changed, methods for minimizing a total rate of energy consumed for the heating or the quick-hot-water-supply may be required.

Embodiments disclosed herein provide a heat pump, which may be selectively operated in communication with a boiler based on a temperature of external air or an electric power rate per unit heat quantity. The heat pump may include the boiler and a quick-hot-water-supply tank that provide a radiation heating operation or a quick-hot-water-supply operation.

Figure 1:
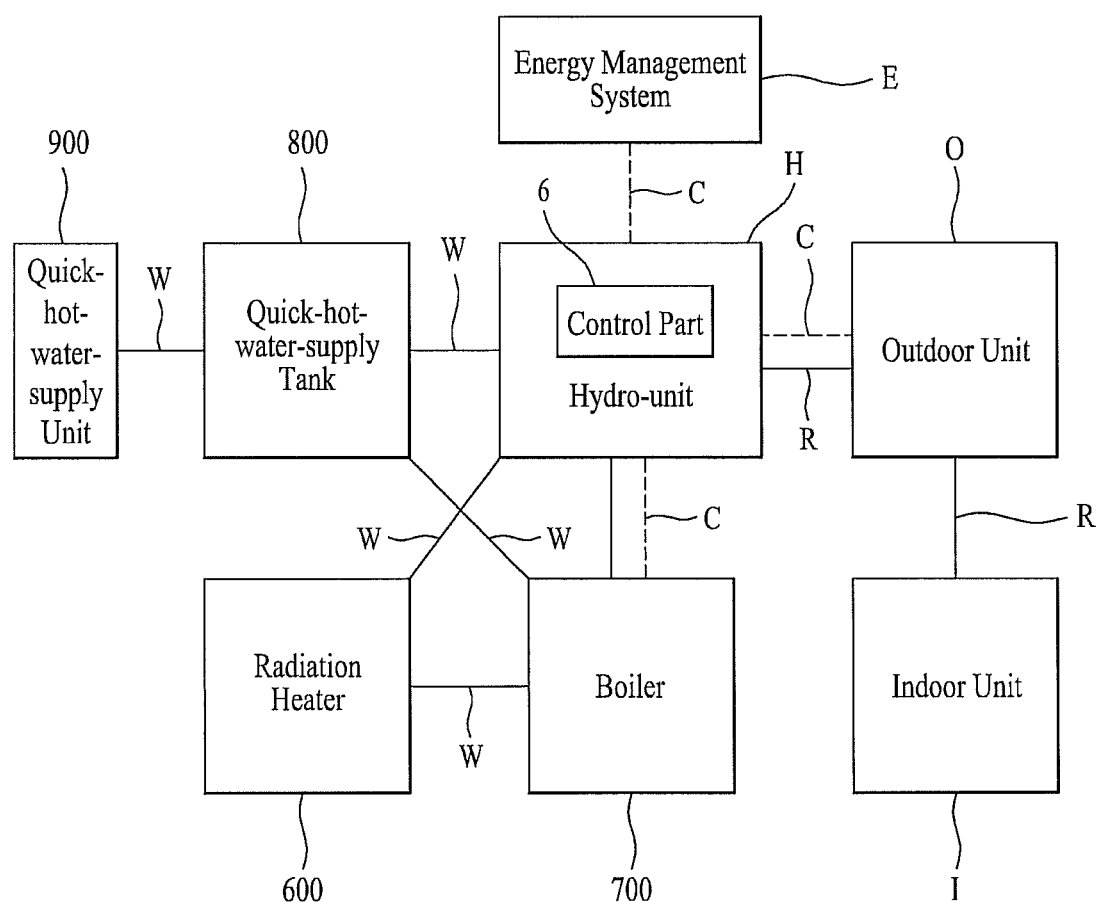
FIG. 1 is a block view of a heat pump according to an embodiment.
Figure 2:
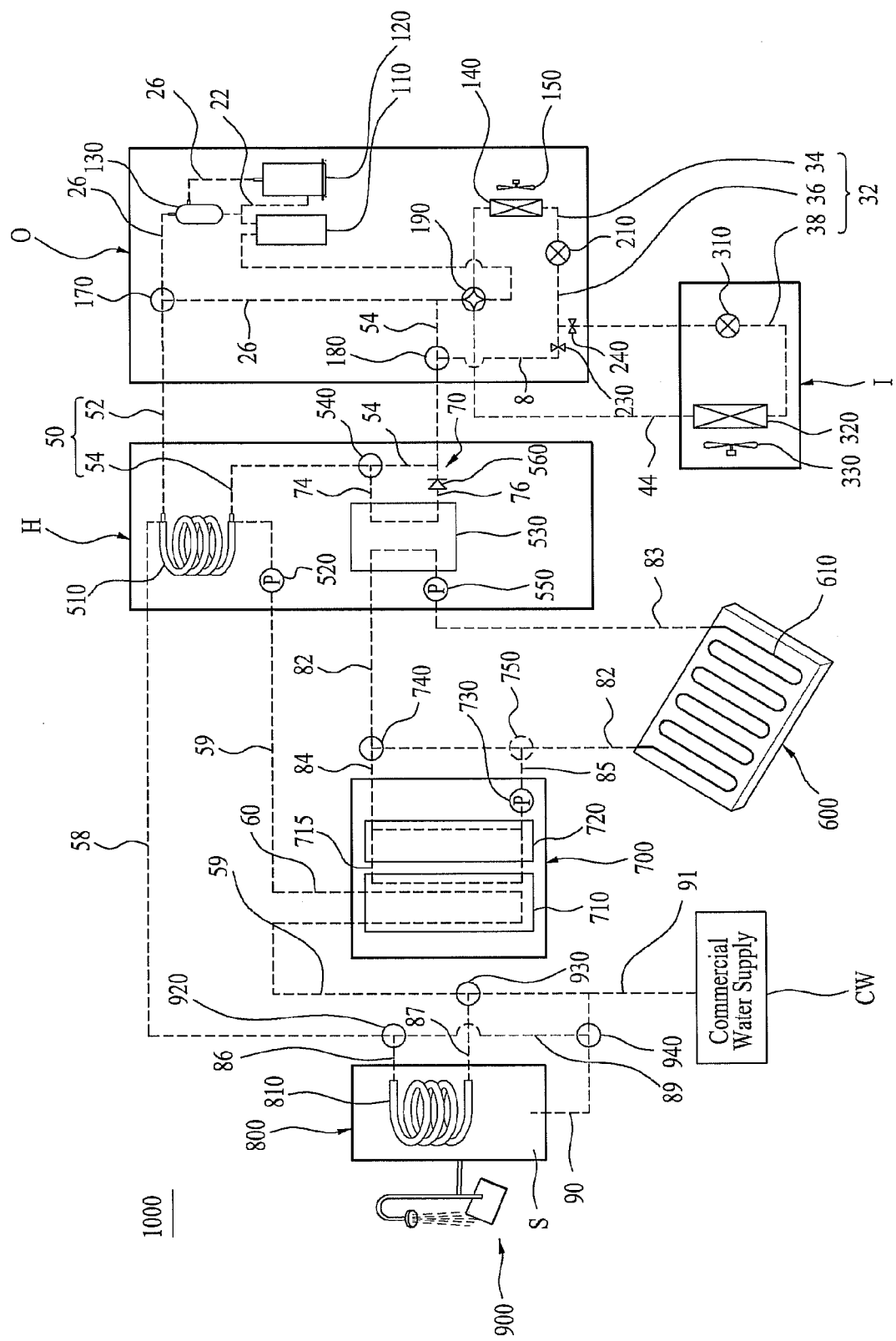
FIG. 2 is a detailed diagram of the heat pump of FIG. 1.

FIG. 1 is a block view of a heat pump 1000 according to an embodiment. The heat pump 1000 of FIG. 1 may include an outdoor unit or device (O) configured to compress refrigerant, a hydro-unit or device (H) configured to heat-exchange refrigerant with water, a boiler 700 configured to heat water selectively, a radiation heater 600 configured to radiate heat by circulating heated water, a quick-hot-water-supply tank 800 configured to store hot-water for a quick-hot-water-supply. For explanation convenience, FIG. 2 illustrates a floor heater configured to heat a floor as the radiation heater 600.

When the heat pump 1000 is used to heat a room, the outdoor unit (O) may supply the refrigerant compressed by the compressor. In a case that an indoor unit or device (I) is provided, the outdoor unit (O) may heat or cool a room, which is a conditioning object, based on a user's request.

The hydro-unit (H) may heat-exchange the refrigerant supplied from the outdoor unit (O) with water circulating in the quick-hot-water-supply tank 800 or the radiation heater 600. The hot-water stored in the quick-hot-water-supply tank 800 may be supplied to a user via a quick-hot-water-supply unit or device 900.

As a result, the quick-hot-water-supply operation or the radiation heating function may be provided using heat gained in a process of condensing refrigerant. However, if a temperature ($T_o$) of the external air is lowered or drops to a preset or predetermined temperature, the efficiency of the quick-hot-water-supply or the radiation heating function gained by the heat exchange between the refrigerant and the water might deteriorate drastically. Because of this, the heat pump 1000 according to this embodiment may further include the boiler 700.

The boiler 700 may also provide the quick-hot-water-supply operation and the heating function like the hydro-unit (H). The boiler 700 and the hydro-unit (H) may be selectively operated based on the temperature ($T_o$) of the external air and a gas rate billed by unit heat amount or power rate. In addition, when the temperature of the external air ($T_o$) is lowered or drops to the preset temperature or less in a case that the boiler 700 is not operated, the water circulating in the hydro-unit (H) and the radiation heater 600 may pass through the boiler 700 to prevent the boiler 700 from freezing and/or bursting. The radiation heater 600 may be, for example, a floor heating pipe or a radiator.

In addition, the heat pump 1000 according to an embodiment may receive information on power rates or gas rates from an energy management device (E) provided in a house under a Smart Grid environment in real time or periodically. A control part or controller of the hydro-unit (H) may control the hydro-unit (H), the boiler 700, and/or the outdoor unit (O) based on the received information or stored information on the power rates.

Embodiments disclosed herein relate to a heat pump including an outdoor unit (O), a hydro-unit (H), and a boiler 700. The outdoor unit (O), the hydro-unit (H), and the boiler 700 may be controlled by the control part of the heat pump or by an energy management system (EMS) connected with the control part of the heat pump so as to communicate with the control part.

In this case, the control part of the heat pump may be connected with the energy management system (EMS) of a Smart Grid. The control part may be provided in the hydro-unit (H), and the hydro-unit (H) may be connected and communicate with the outdoor unit (O), the hydro-unit (H), and the boiler 700. As a result, the EMS (E), the hydro-unit (H), the boiler 700, and the outdoor unit (O) may be connected to each other by a communication line (C) via the hydro-unit (H).

The outdoor unit (O) and the hydro-unit (H) may be connected to each other by a refrigerant pipe (R). The hydro-unit (H), the quick-hot-water-supply tank 800, the radiation heater 600, and the boiler 700 may be connected with or to each other by a water pipe (W) through which water may flow.

FIG. 2 is a detailed diagram of the heat pump of FIG. 1. The heat pump 1000 of FIG. 2 may include an outdoor unit or device (O) including a compressor 120; a hydro-unit or device (H) configured to heat-exchange refrigerant supplied by the outdoor unit (O) with water; a boiler 700 configured to heat water circulating in the hydro-unit (H) selectively; a quick-hot-water-supply tank 800 configured to heat and store water supplied by a commercial water supply system using the water heat-exchanged with the refrigerant by the hydro-unit (H), or to store, after heating, the water supplied by the commercial water supply system using the boiler 700; and a control part or controller configured to control the outdoor unit (O), the hydro-unit (H), and the boiler 700.

For convenience of explanation, FIG. 2 illustrates the radiation heater 600 as including a floor heating pipe, that is, radiation heater pipe 610 that heats a floor of a room. Such a radiation heater having the floor heating pipe will be used as an example. More specifically, the radiation heater 600 radiates heated water that heats the room. The radiation heater 600 may be a floor heating pipe or a radiator.

The air conditioning operation performed by the heat pump 1000 may be configured as a heating operation that heat-air-conditions a room using an air-conditioning function by which internal air is sucked and a cooling operation that cool-air-conditions a room using an air-conditioning function by which internal air is sucked.

An accumulator 110 may be installed in an inlet passage 22 of the compressor 120 provided in the outdoor unit (O) to prevent liquid refrigerant from flowing into the compressor 120. An oil separator 130 may be installed in an outlet passage 26 of the compressor 120 to separate oil from refrigerant and oil exhausted from the compressor 120 to return the oil to the compressor 120. An outdoor heat exchanger 140 may condense or evaporate the refrigerant while heat-exchanging it with external air. The outdoor heat exchanger 140 may be an air refrigerant heat exchanger capable of heat-exchanging refrigerant with external air, or it may be a water refrigerant heat exchanger capable of heat-exchanging cooled water with refrigerant. In this embodiment, the outdoor heat exchange 140 is shown as an air refrigerant heat exchanger that heat-exchanges the external air with the refrigerant for convenience of explanation. When the outdoor heat exchanger 140 is configured as an air refrigerant heat exchanger, an outdoor fan 150 may be provided to blow external air to the outdoor exchanger 140. The outdoor heat exchanger 140 provided in the outdoor unit (O) may be connected with an indoor heat exchanger 320 provided in the indoor unit (I) by a heat exchanger connection pipe 32. Expansion devices 210 and 310 may be provided in the heat exchanger connection pipe 32. The expansion devices may include outdoor expansion device 210 installed adjacent to the outdoor heat exchanger 140, and an indoor expansion device 310 installed adjacent to the indoor heat exchanger 320.

The heat exchanger connection pipe 32 may include an outdoor heat exchanger-outdoor expansion device connection pipe 34 that connects the outdoor heat exchanger 140 with the outdoor expansion device 210, an expansion device connection pipe 36 that connects the outdoor expansion device 210 with the indoor expansion device 310, and an indoor expansion device-indoor heat exchanger connection pipe 38 that connects the indoor expansion device 310 with the indoor heat exchanger 320.

The indoor heat exchanger 320 may be a heat exchanger configured to cool or heat a room by heat-exchanging internal air with refrigerant. An indoor fan 330 may blow internal air to the indoor heat exchanger 320.

In a case that the heat pump 1000 is operated in a cooling mode for cooling a room via the indoor unit (I), the refrigerant compressed in the compressor 120 of the outdoor unit (O) may pass through the outdoor heat exchanger 140, the expansion devices 210 and 310, and the indoor heat exchanger 320 sequentially, to be collected in the compressor 120. Thereafter, the refrigerant collected in the compressor 120 may be evaporated by the indoor heat exchanger 320 employed as an evaporator.

In a case that the heat pump 1000 is operated in a heating mode for heating a room via the indoor unit (I), the refrigerant compressed in the compressor 120 of the outdoor unit (O) may pass through the indoor heat exchanger 320, the expansion devices 210 and 310, and the outdoor heat exchanger 140 sequentially, to be collected in the compressor 120. Thereafter, the refrigerant may be condensed by the indoor heat exchanger 320 employed as a condenser. The outdoor unit (O) may be an air conditioner with both heating and cooling functions, which passes the refrigerant compressed in the compressor 120 through the outdoor heat exchanger 140, the expansion devices 210 and 310, and the indoor heat exchanger 320 sequentially before collecting it in the compressor 120, in a cooling mode, and which passes the refrigerant through the indoor heat exchanger 320, the expansion devices 210 and 310, and the outdoor heat exchanger 140 sequentially before collecting it in the compressor 120, in a heating mode. The outdoor unit (O) may further include a heating/cooling direction control valve 190 that controls or allows flow of the refrigerant to flow to the compressor 120, the outdoor heat exchanger 140, the expansion devices 210 and 310, and the indoor heat exchanger 320 sequentially, or to the compressor 120, the indoor heat exchanger 320, the expansion devices 210 and 310, and the outdoor heat exchanger 140 sequentially. The heating/cooling direction control valve 190 may be connected with the compressor 120, that is, the compressor inlet passage 22 and the compressor outlet passage 26, and it may be connected with the outdoor heat exchanger 140 via the outdoor heat exchanger connection pipe 42. Also, it may be connected with the indoor heat exchanger 320 via the indoor heat exchanger connection pipe 44.

The outdoor unit (O) may include a refrigerant control valve 170 that controls supply of the refrigerant via the compressor outlet passage 26 toward the hydro-unit (H), or the heating/cooling direction control valve 190 selectively. The refrigerant control valve 170 may be a 3-way valve. When the refrigerant control valve 170 is a 3-way valve, it may be provided in the compressor outlet passage 26, and a hydro-unit supply passage 52 may be branched therefrom to supply the refrigerant toward the hydro-unit (H).

In addition, the outdoor unit (O) may include an auxiliary refrigerant control valve 180. The auxiliary refrigerant control valve 180 may be used to control the supply of the refrigerant to a heat exchanger bypass passage 8, which will be described later, or toward the heating/cooling direction control valve 190.

The auxiliary refrigerant control valve 180 may be a 3-way valve. When the auxiliary refrigerant control valve 180 is a 3-way valve, it may be installed in a hydro-unit collection passage 54 connected with the compressor outlet passage 26 to collect the refrigerant in the hydro-unit (H), and the heat exchanger bypass passage 8 may be branched therefrom.

The heat exchanger according to embodiment disclosed herein may further include a heat exchanger bypass valve 230 installed in the heat exchanger bypass passage 8 to control the flow of the refrigerant and a liquid refrigerant valve 240 installed between the heat exchanger bypass passage 8 and the indoor expansion device 310 to control the flow of the refrigerant. The heat exchanger bypass valve 230 may be open when performing a quick-hot-water-supply operation and/or a radiation heating operation. It may be closed when performing a conditioning operation, when performing the conditioning operation and a quick-hot-water-supply operation simultaneously, or when performing the conditioning operation, the quick-hot-water-supply operation, and a radiation heating operation simultaneously.

The liquid refrigerant valve 240 may be open when performing the conditioning operation, or when performing the conditioning operation and the quick-hot-water-supply operation, or when performing the conditioning operation, the quick-hot-water-supply operation and the radiation heating operation simultaneously. The liquid refrigerant valve 240 may be closed when performing the quick-hot-water-supply operation and the radiation heating simultaneously, or when performing either of the two operations.

The heat pump 1000 according to embodiments disclosed herein may include the hydro-unit (H) that heat-exchanges the refrigerant supplied by the outdoor unit (O) with water for radiation heating. The hydro-unit (H) may further include a first heat exchanger 510 and a second heat exchanger 530 that heat-exchange the refrigerant with water for quick-hot-water-supply or heating.

The first heat exchanger 510 and the second heat exchanger 530 may be configured such that the refrigerant supplied from the outdoor unit (O) flows therethrough sequentially. If necessary, the second heat exchanger 530 may be configured to bypass the refrigerant therethrough.

The first heat exchanger 510 may be provided in a hydro-unit circulation passage 50 of the outdoor unit (O) and may condense, expand, and evaporate the refrigerant exhausted from the compressor 120 after the refrigerant is used for the quick-hot-water-supply. The hydro-unit circulation passage 50 may include a hydro-unit supply passage 52 through which the refrigerant of the outdoor unit (O), in particular, the refrigerant compressed in the compressor 120, flows to the first heat exchanger 510, and a hydro-unit collection passage 54 through which the refrigerant exhausted from the first heat exchanger 510 flows to the outdoor unit (O), in particular, to the heating/cooling direction control valve 190.

One end of the hydro-unit supply passage 52 may be connected to the refrigerant control valve 170 provided in the compressor outlet passage 26 and the other end may be connected with the first heat exchanger 510. One end of the hydro-unit collection passage 54 may be connected with first heat exchanger 510 and the other end may be connected with the compressor outlet passage 26.

When the refrigerant control part or controller 6 controls the refrigerant to flow to the first heat exchanger 510, the first heat exchanger 510 may function as a desuperheater that condenses the refrigerant overheated in the compressor 120 by heat-exchanging it with the water used for radiation heating. In this way, the first heat exchanger 510 may heat the water supplied for the quick-hot-water-supply quickly.

The first heat exchanger 510 may be a double-pipe type heat exchanger having a heat transfer member located between a refrigerant passage and a water passage formed in internal and external areas thereof, or alternatively it may be a plate type heat exchanger having a heat transfer member or plate located between the refrigerant passage and the water passage. For explanation convenience, this embodiment shows the first heat exchanger 510 as a double-pipe type heat exchanger and the second heat exchanger 530 may be as a plate type heat exchanger; however, embodiments are not so limited.

The first heat exchanger 510 may be connected with the quick-hot-water-supply tank 800 via a hot-water supply pipe 58 and a hot-water collection pipe 59. A quick-hot-water-supply pump 60 may be installed in the hot-water collection pipe 59.

The hydro-unit (H) of the heat pump 1000 according to embodiments disclosed herein may include a second heat exchanger refrigerant control valve 540 configured to control the flow of refrigerant such that the refrigerant having passed through the first heat exchanger 510 may pass through or bypass the second heat exchanger 530. The second heat exchanger 530 may be provided in the hydro-unit collection passage 54 and the refrigerant having passed through the first heat exchanger 510 may be used for the radiation heating, such as the floor heating. Alternatively, the second heat exchanger 530 may be installed for the user to operate the radiation heating selectively.

The second heat exchanger refrigerant control valve 540 may control flow of the refrigerant to pass through the second heat exchanger 530, when the user selects the floor heating. That is, when the radiation heating operation is a floor heating operation, the second heat exchanger refrigerant control valve 540 may control a direction of refrigerant flow to flow to the second heat exchanger 530. When the radiation heating operation is not provided, the second heat exchanger refrigerant control valve 540 may control the direction of refrigerant flow to bypass the second heat exchanger 530.

When operating or performing the radiation heating operation, when operating or performing the radiation heating operation and the quick-hot-water-supply operation simultaneously, and when operating or performing the radiation heating operation, the quick-hot-water-supply operation, and the conditioning operation simultaneously, the second heat exchanger refrigerant control valve 540 may control flow of the refrigerant to flow to the second heat exchanger 530.

As shown in FIG. 2, the second heat exchanger refrigerant control valve 540 may be a single 3-way valve installed in the quick-hot-water-supply passage 50, in particular, the hydro-unit collection passage 54 to control the direction of refrigerant flow. In such a case that the second heat exchanger refrigerant control valve 540 is the 3-way valve, an inlet and a first outlet of the second heat exchanger refrigerant control valve 540 may be connected to the hydro-unit collection passage 54, and a second outlet thereof may be connected to a heating inlet passage 74. The second heat exchanger refrigerant control valve 540 may include a first valve installed in the heating inlet passage 74 to be opened in the radiation heating operation and to be closed when the radiation heating operation is not performed, and a second valve installed in the hydro-unit collection passage 54 to be closed in the radiation heating operation and to be opened when the radiation heating operation is not performed.

A check valve 560 may be installed in the heating outlet passage 76 to stop the refrigerant of the hydro-unit collection passage 54 from flowing backward to the second heat exchanger 530 through the heating outlet passage 76. The heat pump 1000 according to embodiments disclosed herein may further include the second heat exchanger 530, which may be connected with the hydro-unit circulation passage 50 and a water refrigerant heat exchanger connection passage 70, for the refrigerant having passed through the first heat exchanger 510 to flow to the hydro-unit circulation passage 50 after heating the water. The water refrigerant heat exchanger connection passage 70 may include a heating inlet passage 74 to draw the refrigerant of the hydro-unit collection passage 54 into the second heat exchanger 530 and a heating outlet passage 76 to exhaust the refrigerant having passed through the second heat exchanger 530 to the hydro-unit collection passage 54.

The second heat exchanger 530 may be a condensation heat exchanger in which the refrigerant initially condensed in the first heat exchanger 510 is condensed additionally by heat-exchanging with water. The second heat exchanger 530 may have a refrigerant passage through which the refrigerant having passed through the first heat exchanger 510 passes and a water passage through which the water used for floor heating or radiator heating passes.

The water heat-exchanged with the refrigerant in the second heat exchanger 530 may be used in the radiation heater part 600 for heating via a radiation process.

With the heat pump 1000 according to embodiments disclosed herein, the second heat exchanger 530 may be connected with the radiation heater 600 installed in the floor of a room by a floor supply pipe 82 and a floor collection pipe 83. A floor heating pump 550 may be installed in the floor collection pipe 83. The refrigerant having passed through the first heat exchanger 510 may be additionally used for heating the floor of the room via the second heat exchanger 530.

The heat pump 1000 according to embodiments disclosed herein may further include the boiler 700, which may function as a heat source for heating or quick-hot-water-supply, rather than the hydro-unit 600. When a temperature of external air is a preset or predetermined temperature or less, efficiency of heating using the hydro-unit (H) may deteriorate drastically. Because of this, when the external temperature decreases to lower than the preset temperature, the heat pump 1000 may selectively operate the boiler 700 as a heat source used for heating.

The boiler 700 may include a combustion heating part or heater 720 that combusts fossil fuels and a heat exchange heating part or heater 710 that heats water in the combination heating part 720 using a heat exchange method. The combustion heating part 720 may heat water supplied via the floor supply pipe 82. The heat exchange heating part 710 may heat-exchange water supplied from a quick-hot-water-supply tank 800, which will be described later, with the water heated in the combustion heating part 720, to heat the water supplied from the quick-hot-water-supply tank 800.

The floor supply pipe 82 may include a first boiler valve 740 and a second boiler valve 750. The first boiler valve 740 and the second boiler valve 750 may be provided in the floor supply pipe 82, with a boiler supply pipe 84 and a boiler collection pipe 85 connected thereto, respectively. The boiler supply pipe 84 and the boiler collection pipe 85 may be pipes that pass through the boiler 700.

The boiler supply pipe 84 and the boiler collection pipe 85 may supply the water circulating through the hydro-unit (H) to the combustion heating part 720 provided in the boiler 700. The first boiler valve 740 and the second boiler valve 750 may directly supply the water supplied from the hydro-unit (H) to the radiation heater part 710, or they may selectively shut off the passage to flow the water via the combustion heating part 720 of the boiler 700.

The water supplied from the hydro-unit (H) may pass through the boiler 700, which will be described in more detail later, to prevent the boiler 700, when not in operation from freezing or bursting, or to operate the boiler 700.

The boiler 700 may further include a pump 730 installed in the boiler collection pipe 85 through which the water supplied from the quick-hot-water-supply tank 800 may pass. When the boiler 700 is put into operation, water may be heated to be used in the quick-hot-water-supply operation.

The boiler supply pipe 84 may be branched from the inside of the boiler 700 to partially supply the water heated in the combustion heating part 720 to the heat exchange heating part 710. Partially supplying the water heated in the combustion heating part 720 to the heat exchange heating part 710 may be enabled by a passing pipe 715 branched from a pipe passing through the combustion heating part 720 that passes through the heat exchange heating part 710.

The passing pipe 715 may allow the water heated by the combustion heat generated in the combustion heating part 720 to be supplied to the heat exchange heating part 710 to heat the water supplied from a commercial water supply (CW) to the quick-hot-water-supply tank 800. This feature will be described in more detail later.

The heat pump 1000 according to embodiments disclosed herein may further include the quick-hot-water-supply tank 800 that provides the quick-hot-water-supply operation. The quick-hot-water-supply tank 800 may include a storage room (S) that stores water, which may be used for quick-hot-water-supply, and a quick-hot-water-supply tank heat exchanger 810 provided in the storage room (S) to heat-exchange the water stored in the storage room (S) by using the water heat-exchanged with the refrigerant in the hydro-unit (H).

The quick-hot-water-supply tank heat exchanger 810 may be supplied the water having passed through the hydro-unit (H) via a hot-water-supply branched pipe 86 branched from the hot-water supply pipe 58, and the water may be heat-exchanged with the water stored in the quick-hot-water-supply tank 800. Thereafter, the water may be collected in a hot-water collection pipe 59 via a hot-water collection branched pipe 87.

A first quick-hot-water-supply valve 920 and a second quick-hot-water-supply valve 930 may be provided at ends of the hot-water-supply pipe 58 and the hot-water collection pipe 59, respectively. The hot-water-supply branched pipe 86 and the hot-water collection branched pipe 87 may be branched from the first quick-hot-water-supply valve 920 and the second quick-hot-water-supply valve 930, respectively.

The hot-water collection pipe 59 may be connected to a commercial water supply connection pipe 91 via the second quick-hot-water-supply valve 930, to supply the commercial water to the boiler 700 therethrough. A commercial water supply pipe 90 may be branched from the commercial water supply connection pipe 91 to supply the commercial water to the storage room (S) directly. A commercial water supply valve 940 may be provided in the commercial water supply pipe 90, and a quick-hot-water-supply tank heat exchanger bypass pipe 89 may be provided to connect the first quickwater-supply valve 920 and the commercial water valve 940 to each other. Each of the first quick-hot-water-supply valve 920, the second quick-hot-water-supply valve 930, and the commercial water valve 940 may be a 3-way valve.

A detailed description relating to operations of the first quick-hot-water-supply valve 920, the second quick-hot-water-supply valve 930 and the commercial water valve 940 will follow hereinbelow.

The quick-hot-water-supply tank 800 may supply hot-water stored therein to the quick-hot-water-supply device 900 based on a user's request. As mentioned above, to provide the quick-hot-water-supply operation, the heat pump 1000 according to embodiments disclosed herein may heat the water stored in the quick-hot-water-supply tank 800 using the water heat-exchanged with the refrigerant in the hydro-unit (H), or it may supply the water supplied from the commercial water supply (CW) to the quick-hot-water-supply tank 800 after heating the water using the boiler 700.

Specific conditions required to operate the hydro-unit (H) and the boiler 7000 as heat sources used in the quick-hot-water-supply operation and a description relating to the operation will be described in detail hereinbelow.

Figure 3:
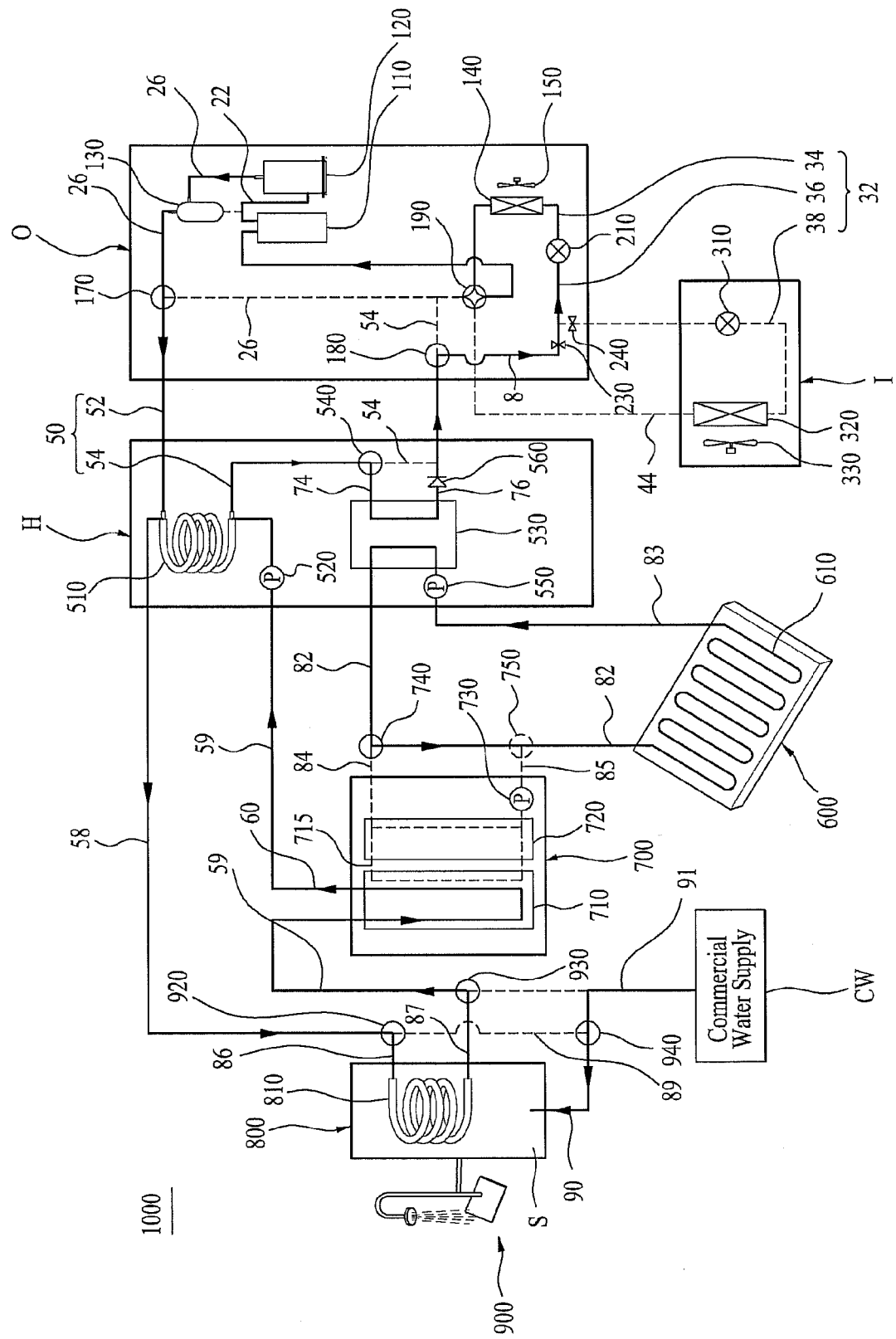
FIG. 3 is a diagram illustrating a flow of water and refrigerant in one operation mode of the heat pump of FIG. 1.

FIG. 3 is a diagram illustrating a flow of water and refrigerant in one operation mode of the heat pump of FIG. 1. FIG. 3 illustrates an operation mode for controlling the heat pump 1000 to perform a floor heating function or operation. For explanation convenience, it is shown that the indoor unit (I) is not operated.

For explanation convenience, a preset or predetermined temperature below approximately 0° C. out of temperatures distinguishing operation modes of the heat pump according to embodiments is defined as a first temperature ($T_1$), and a preset or predetermined temperature above approximately 0° C. is defined as a second temperature ($T_2$). When the temperature of the external air ($T_o$) is equal to or greater than the preset second temperature ($T_2$) above freezing, the heat pump 1000 according to embodiments is used for the quick-hot-water-supply operation or function and the floor heating function. The heat pump 1000 according to embodiments may include the boiler 700. When the temperature of the external air ($T_o$) is equal to or greater than the second temperature ($T_2$) above approximately 0° C., the boiler 700 need not be operated.

The refrigerant supplied to the outdoor unit (O) may be supplied to the outdoor heat exchanger 140. Thereafter, the refrigerant may be expanded in the outdoor expansion device 210 and evaporated in the outdoor heat exchanger 140. The refrigerant evaporated in the outdoor heat exchanger 140 may be supplied to the compressor 120.

The heating/cooling direction control valve 190 may supply the refrigerant evaporated in the outdoor heat exchanger 140 to the compressor 120, via the accumulator 110 provided at a front end of the compressor 120. The refrigerant compressed in the compressor 120 may then be supplied to the compressor outlet passage 26 via the oil separator 130.

The refrigerant compressed in the compressor 120 may be supplied to the hydro-unit (H) via the compressor outlet passage 26. More specifically, the refrigerant supplied to the hydro-unit (H) via the hydro-unit supply passage 52 branched from the refrigerant control valve 170 provided in the compressor outlet passage 26 may be supplied to the first heat exchanger 510 and the second heat exchanger 530 sequentially.

The refrigerant passing through the first heat exchanger 510 may heat the water circulating through the quick-hot-water-supply tank heat exchanger 810 and the first heat exchanger 510. The refrigerant passing through the second heat exchanger 530 may heat the water circulating through the radiation heater 600 and the second heat exchanger 510. As a result, the water heat-exchanged with the refrigerant in the first heat exchanger 510 may heat the water stored in the storage room (S) located in the quick-hot-water-supply tank 800, to provide the quick-hot-water-supply function or operation. The water stored in the storage room (S) located in the quick-hot-water-supply tank 800 may be supplied from the commercial water supply (CW) via the commercial water supply pipe 90.

In the operation mode shown in FIG. 3, the water heat-exchanged with the refrigerant in the first heat exchanger 510 of the hydro-unit (H) may circulate through the quick-hot-water-supply tank heat exchanger 810 of the quick-hot-water-supply tank 800. That is, the water circulating through the first heat exchanger 510 of the hydro-unit (H) and the quick-hot-water-supply tank heat exchanger 810 of the quick-hot-water-supply tank 800 may suck heat in the first heat exchanger 510 and radiate heat in the quick-hot-water-supply tank heat exchanger 810 of the quick-hot-water-supply tank 800. This operation may be repeated.

The water circulating through the first heat exchanger 510 of the hydro-unit (H) and the quick-hot-water-supply tank heat exchanger 810 of the quick-hot-water-supply tank 800 may be supplied to the heat exchange heating part 710 of the boiler 700 via the boiler passing pipe 60 branched from the hot-water collection pipe 59. In such a case, since the boiler 700 is not operated, the heat source heating water for the quick-hot-water-supply may be only the first heat exchanger 510. In this case, the first boiler valve 740 and the second boiler valve 750 may control the water heat-exchanged with the refrigerant in the second heat exchanger 530 so as not to pass through the boiler 700.

In the operation mode shown in FIG. 3, the water heat-exchanged with the refrigerant in the second heat exchanger 530 of the hydro-unit (H) may be circulated through the heating pipe 610 of the radiation heater 600. In other words, the water circulating through the second heat exchanger 530 and the heat exchanger 610 of the radiation heater 600 sucks heat in the second heat exchanger 530 and the water radiates heat in the heat exchanger 610 of the radiation heater 600. This process may be repeated.

The water circulating through the second heat exchanger 530 of the hydro-unit (H) and the heat exchanger 610 of the radiation heater 600 does not need to pass through the boiler 700, because the boiler 700 has little possibility of freezing and bursting when the temperature of the external air ($T_o$) is equal to or greater than the preset second temperature ($T_2$) above approximately 0° C.

The preset second temperature ($T_2$) above approximately 0° C. may be approximately equal to or greater than approximately 3° C. and equal to or less than approximately 7° C. For example, the preset second temperature ($T_2$) above approximately 0° C. may be approximately 5° C. A temperature range higher than the second temperature ($T_2$) above approximately 0° C. may be a highest one out of temperature ranges in which the heating function performed using the heat pump.

In the operation mode shown in FIG. 3, a quick-hot-water-supply pump 520 and the floor heating pump 550 may be operated to pump water circulating through the hydro-unit (H). The second heat exchanger refrigerant control valve 540 provided in the hydro-unit (H) may control a flow direction of the refrigerant having passed through the first heat exchanger 510 to pass through the second heat exchanger 530.

Figure 4:
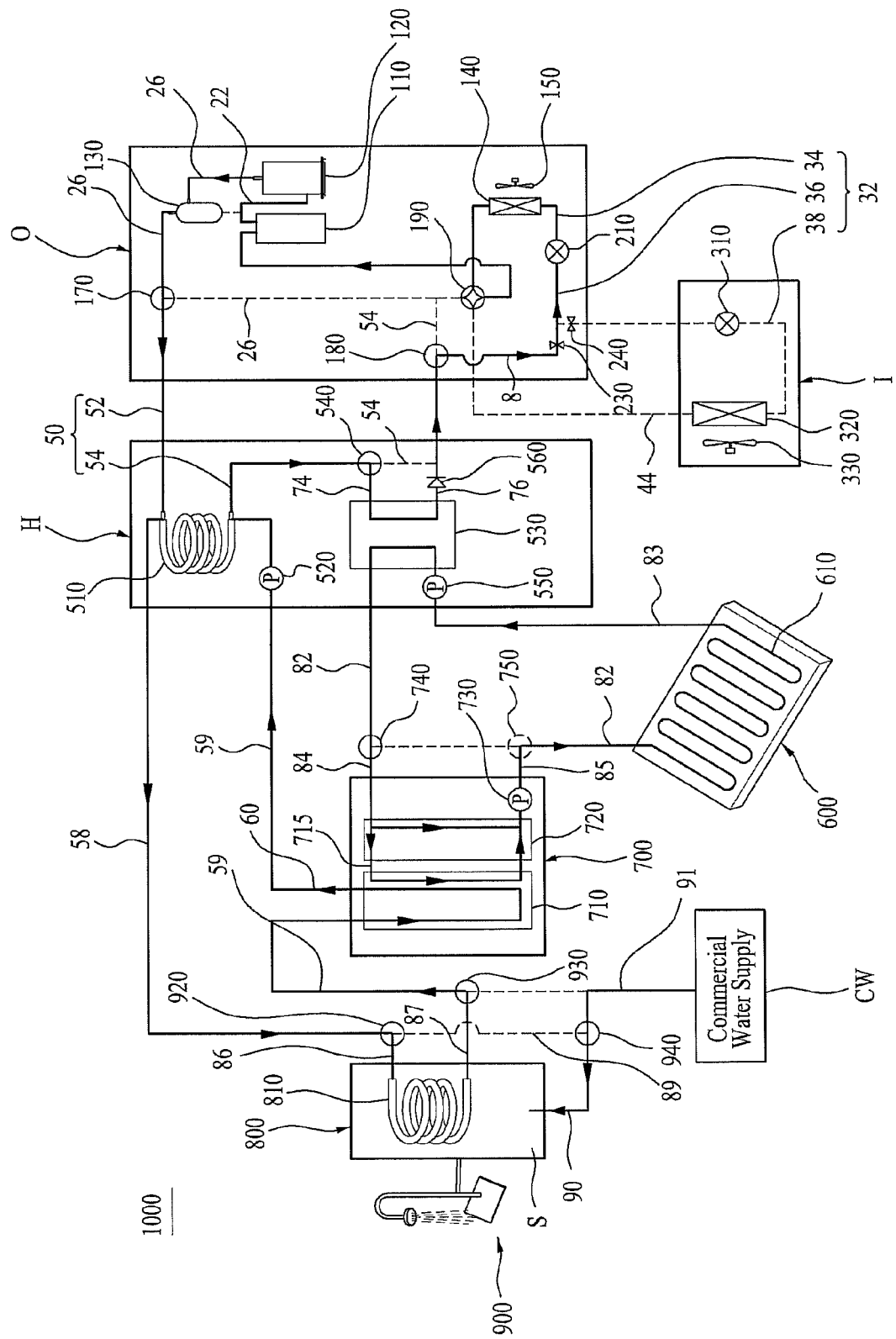
FIG. 4 is a diagram illustrating a flow of water and refrigerant in another operation mode of the heat pump of FIG. 1.

FIG. 4 is a diagram illustrating a flow of water and refrigerant in another operation mode of the heat pump 1000 of FIG. 1. Repetitive description with reference to FIG. 3 has been omitted. Similar to the operation mode described with reference to FIG. 3, it is assumed that the indoor unit (I) is not operated and that a floor heating function or operation is provided by the heat pump 1000.

The example of FIG. 4 shows an operation mode when the temperature ($T_o$) of the external air is greater than a preset or predetermined first temperature ($T_1$) below approximately 0° C. and less than a preset second temperature ($T_2$) above approximately 0° C. According to the operation mode shown in FIG. 4, water heat-exchanged with refrigerant in the second heat exchanger 530 may be circulated through the heat exchanger 610 of the radiation heater 600 to heat the floor of a room, similar to the operation mode of FIG. 3.

However, the temperature ($T_o$) of the external air may be the preset second temperature ($T_2$) above approximately 0° C. The boiler 700 and the pipes may freeze and burst due to water remaining in the pipes of the boiler 700.

As mentioned above, when the temperature of the external air ($T_o$) is equal to or less than the second temperature ($T_2$) above approximately 0° C., which is approximately equal to or greater than approximately 3° C. and equal to or less than approximately 7° C., the water not circulating but remaining in the pipes of the boiler 700 may freeze and burst. To prevent the freezing and bursting of the boiler 700, the heat pump 1000 according to embodiments disclosed herein may control the water supplied to the radiation heater 600 to pass through the boiler 700, regardless of the operation state or the standby state of the boiler 700, when the temperature of the external air (To) is equal to or less than the preset first temperature ($T_1$) below approximately 0° C.

The preset first temperature ($T_1$) below approximately 0° C. may be equal to or greater than approximately −7 degrees and equal to or less than approximately −3 degrees (−7° C. ~−3° C.). For example, when the temperature ($T_o$) of external air is equal to or greater than the preset first temperature ($T_1$) below approximately 0° C., which may be approximately −5° C., the boiler 700 for floor heating or hot-water-supply may not be operated necessarily and the floor heating or the quick-hot-water-supply may be performed only by the heat exchange performed in the hydro-unit (H).

However, as mentioned above, the water supplied to the radiation heater 600 may be controlled to pass through the boiler 700 to prevent freezing and bursting of the boiler 700. In this case, the first boiler valve 740 and the second boiler valve 750 may be controlled for the water heat-exchanged with the refrigerant in the second heat exchanger 530 to pass through the boiler 700. The quick-hot-water-supply pump 520 or the floor heating pump 550 may be operated to pump the water circulating through the hydro-unit (H).

Figure 5:
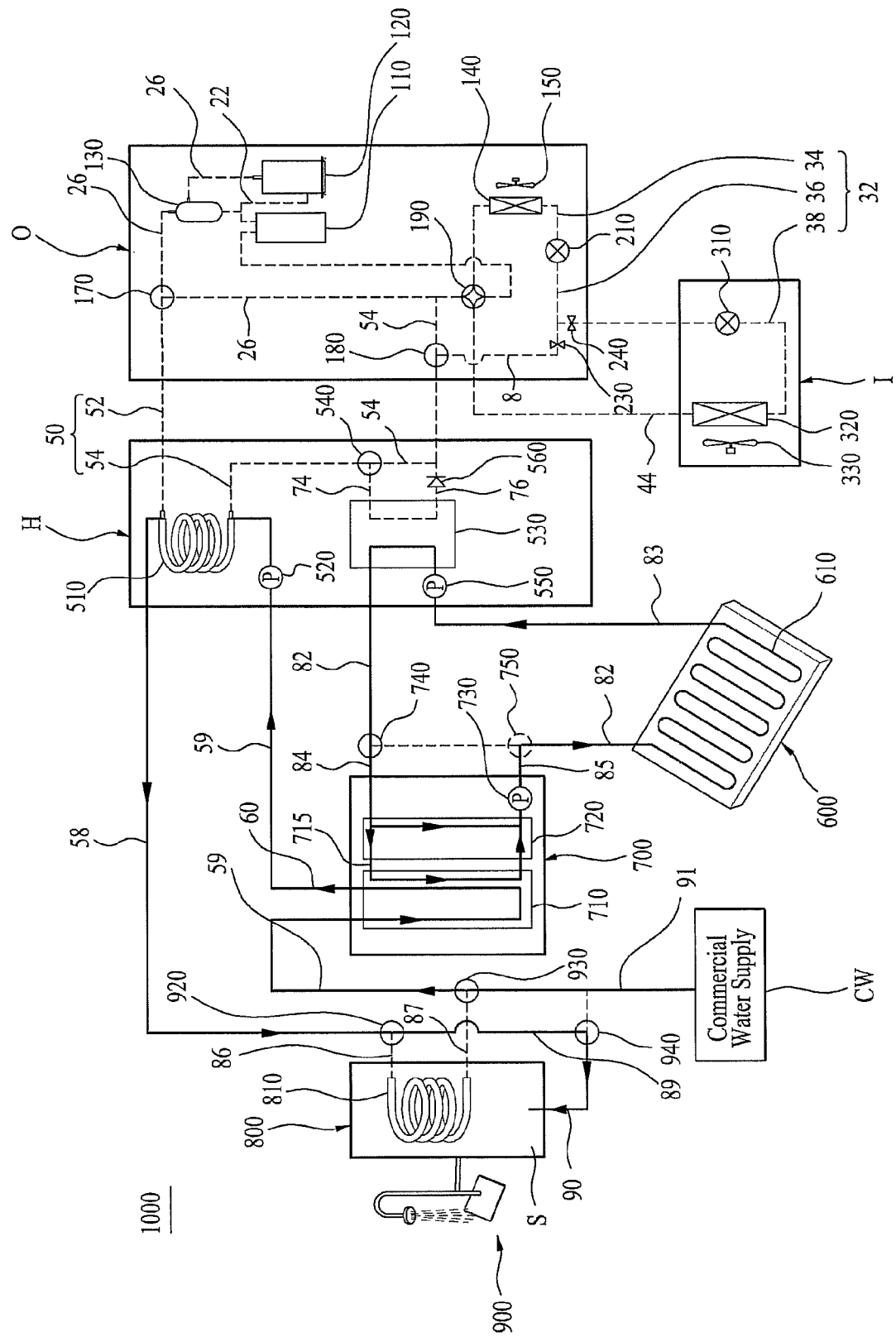
FIG. 5 is a diagram illustrating a flow of water and refrigerant in a further operation mode of the heat pump of FIG. 1.

FIG. 5 is a diagram illustrating a flow of water and refrigerant in a further operation mode of the heat pump of FIG. 1. Compared with the descriptions of FIGS. 3 and 4, repetitive description has been omitted. Like the operation modes discussed above with reference to FIGS. 3 and 4, it is assumed that the indoor unit (I) is not operated and that the boiler 700 instead of the heat pump 1000 is operated to heat the floor. For example, the preset first temperature ($T_1$) below approximately 0° C. may be approximately −7° C. to approximately −3° C. When the temperature ($T_o$) of the external air is equal to or less than the first preset temperature ($T_1$) below approximately 0° C., which means it is cold weather in winter, the heating efficiency using refrigerant may deteriorate drastically and a satisfactory hot-water temperature cannot be reached. As a result, in a case that the temperature of the external air is very low, the operation of the hydro-unit (H) may be stopped and the boiler 700 may be operated.

First, the quick-hot-water-supply operation will be described. When the temperature ($T_o$) of the external air is equal to or less than the preset first temperature ($T_1$) below approximately 0° C., the heat pump 1000 according to embodiments may heat the commercial water supplied from the commercial water supply system using the boiler 700, and supply the heated water directly to the quick-hot-water-supply tank 800, not heating the water stored in the quick-hot-water-supply tank 800 using the quick-hot-water-supply tank heat exchanger 810 provided in the quick-hot-water-supply tank 800.

As a result, the commercial water drawn via the commercial water supply connection pipe 91 may flow along the hot-water collection pipe 59 and may pass through the heat exchange heater 710 of the boiler 700 via the boiler passing pipe 60. As the boiler 700 is operating, the commercial water heated by the heat exchange performed in the heat exchange heater 710 may pass through the hydro-unit (H) before being supplied to the quick-hot-water-supply tank 800 via the hot-water supply pipe 58.

The commercial water supplied via the hot-water supply pipe 58 may not be supplied to the hot-water-supply branched pipe 86 from the first quick-hot-water-supply valve 920, but rather may be supplied to the quick-hot-water-supply tank heat exchanger bypass pipe 89 connected with the first quick-hot-water-supply valve 920. The water supplied to the quick-hot-water-supply tank heat exchanger bypass pipe 89 may be supplied to the storage room (S) located in the quick-hot-water-supply tank 800 via the commercial water supply pipe 90. By this process, the water supplied from the commercial water supply system (CW) may be heated in the boiler 700, and the heated water may be supplied directly to the quick-hot-water-supply tank 800. In this case, the second quick-hot-water-supply valve 930 may control the water supplied from the commercial water supply connection pipe 91 to be supplied into the hot-water collection pipe 59. The first quick-hot-water-supply valve 920 may control the water supplied from the hot-water supply pipe 58 to be supplied to the quick-hot-water-supply tank heat exchanger 89, not the hot-water supply branched pipe 86, and it may shut off the water supplied from the commercial water supply system (CW) to be supplied to the commercial water supply pipe 90, to control only the water supplied from the quick-hot-water-supply tank heat exchanger 89 to be supplied to the storage room(s) of the quick-hot-water-supply tank 800. The quick-hot-water-supply pump provided in the hot-water collection pipe 59 may be operated, even when the hydro-unit (H) is not operated.

In the case of floor heating, the water may be circulated along the same passage as the passage of the floor heating shown in FIG. 4. In other words, FIG. 4 illustrates that the water circulating through the second heat exchanger 530 of the hydro-unit (H) may be supplied to the radiation heater 600 via the combustion heater 720 of the boiler 700.

Here, there is a different feature that the heat source for the floor heating is not the hydro-unit (H), but rather, the boiler 700. Even when the hydro-unit (H) is not operated, the floor heating pump 550 provided in the floor collection pipe may be operated to circulate the water, and the boiler pump 730 provided in the boiler 700 may be operated, too.

Figure 6:
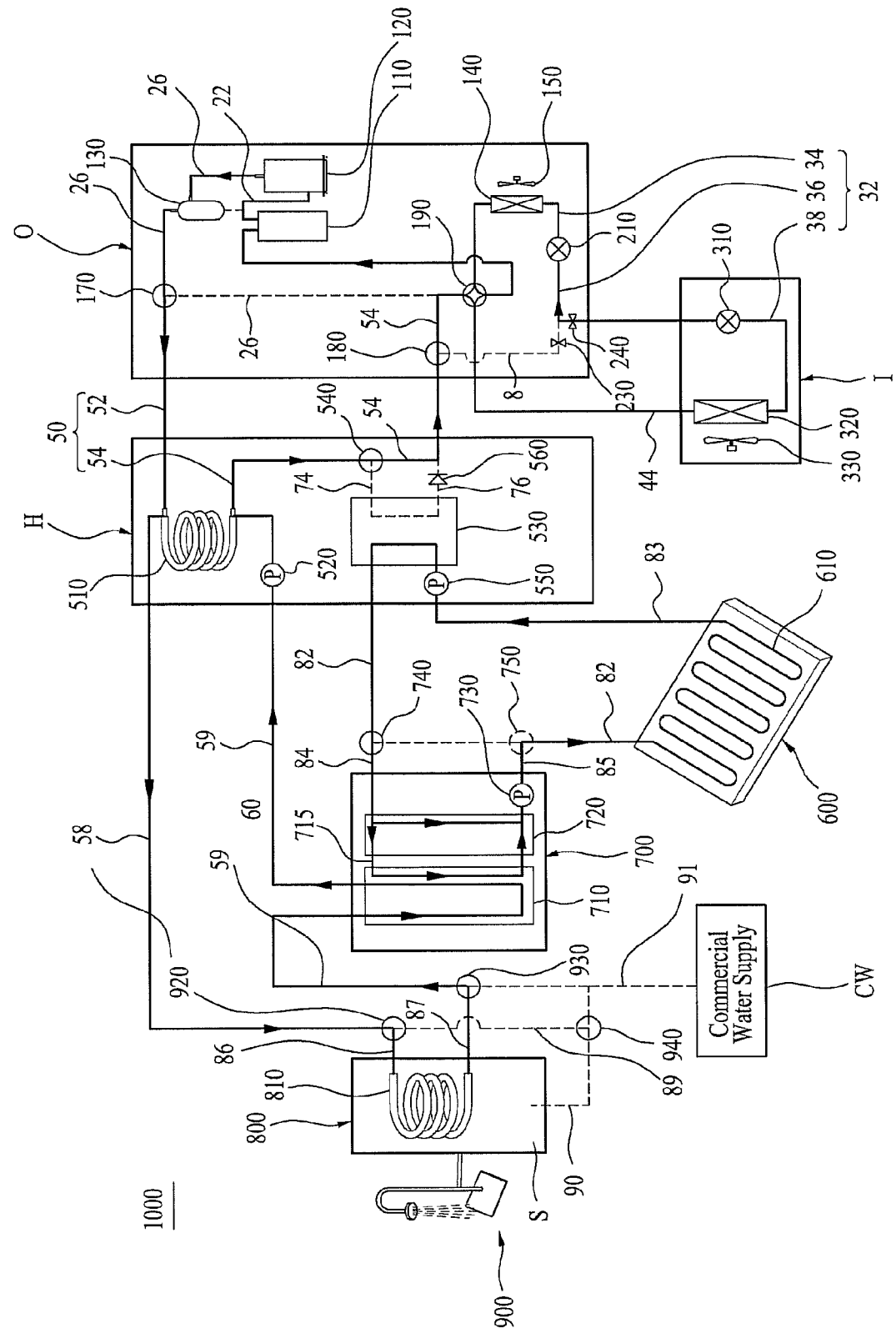
FIG. 6 is a diagram illustrating a flow of water and refrigerant in a still further operation mode of the heat pump of FIG. 1.

FIG. 6 is a diagram illustrating a flow of water and refrigerant in a still further operation mode of the heat pump of FIG. 1. Like the operation mode shown in FIG. 4, the operation mode shown in FIG. 6 is an operation mode performed when the temperature ($T_o$) of the external air is lower than the preset second temperature ($T_2$) above approximately 0° C. and higher than the preset first temperature ($T_1$) below approximately 0° C. The operation mode shown in FIG. 4 is configured to heat the floor using the water circulating through the heating pipe 610 of the radiation heater 600 after being heat-exchanged with the refrigerant in the second heat exchanger 530 of the hydro-unit (H). However, the operation mode shown in FIG. 6 is configured to enable the heating function using the indoor unit (I), omitting the floor heating performed using the radiation heater 600.

The heat pump 1000 according to embodiments enables heating using the radiation process and heating using the indoor unit (I). Considering a capacity of the compressor provided in the outdoor unit (O), performing both of the heating processes using the outdoor unit (O) may not be sufficient. Because of this, the operation mode shown in FIG. 6 provides heating using the indoor unit (I) and floor heating using the radiation process.

Both floor heating and the internal air heating using the indoor unit (I) may use phase-change of refrigerant in a repeated range in a cooling cycle. The floor heating and the heating using the outdoor unit (I) may be configured not to be operated simultaneously, different from quick-hot-water-supply operation. As a result, the operation mode shown in FIG. 6 may provide the quick-hot-water-supply operation in a state that the floor heating is stopped, simultaneously with performing the indoor heating operation using the indoor unit (I). As a result, the refrigerant having passed through the first heat exchanger 510 of the hydro-unit (H) after being compressed in the outdoor unit (O) need not pass through the second heat exchanger 530 of the hydro-unit (H). Because of this, the second heat exchanger refrigerant control valve 540 provided in the hydro-unit (H) may control the refrigerant having passed through the first heat exchanger 510 of the hydro-unit (H) to be guided toward the heating/cooling direction control valve 190. The heating/cooling direction control valve 190 may guide the refrigerant supplied from the hydro-unit (H) toward the indoor heat exchanger connection pipe 44 and the refrigerant may be guided by the indoor heat exchanger 320 thereafter.

Heating of the internal air may be performed by the heat acquired in the condensing process of the refrigerant in the indoor heat exchanger 320. The condensed refrigerant may be supplied to the outdoor heat exchanger 140 via the heat exchanger connection pipe 32 configured to connect the outdoor heat exchanger 140 provided in the outdoor unit (O) with the indoor heat exchanger 320 provided in the indoor unit (I). Thereafter, the refrigerant may be expanded in the expansion devices 210 and 310. The refrigerant may be evaporated in the outdoor heat exchanger 140 and may be guided toward the compressor 120 by the heating/cooling direction control valve 190.

The indoor heating performed by the indoor unit (I) and the quick-hot-water-supply may be provided by the operation mode simultaneously. Of course, in a case that the heating is requested, the radiation heater 600 may provide the floor heating function after the second heat exchanger refrigerant control valve 540 controls the refrigerant having passed through the first heat exchanger 510 to pass through the second heat exchanger 530. At this time, the capacity of the compressor has to be put into operation.

This operation mode may be operated when the temperature ($T_o$) of the external air is lower than the preset second temperature ($T_2$) above approximately 0° C. and higher than the preset first temperature ($T_1$) below approximately 0° C. To prevent freezing and bursting, water has to circulate continuously to circulate the water through the hydro-unit (H) and the radiation heater 600 even without providing the floor heating. Also, the water may pass through the boiler 700 before circulating through the hydro-unit (H) and the radiation heater 600. The first boiler valve 740 and the second boiler valve 750 provided in the boiler supply pipe 84 may control the water, which will circulate through the hydro-unit (H) and the radiation heater 600, to pass through the boiler 700. The boiler pump 730 and/or the floor heating pump 550 may be operated to pump the water circulating through the hydro-unit (H).

In addition, when the temperature ($T_o$) of the external air is higher than the preset second temperature ($T_2$) above approximately 0° C., by performing the heating using the indoor unit (I) and the floor heating at the same time, there is no danger of freezing and bursting of the boiler 700, and the water, which will circulate through the hydro-unit (H) and the radiation heater 600, does not have to pass through the boiler 700. Also, when the temperature ($T_o$) of the external air is higher than the preset second temperature ($T_2$) above approximately 0° C., by performing only the heating using the indoor unit (I) and omitting the floor heating, circulation of the water circulating for the floor heating may be stopped.

Figure 7:
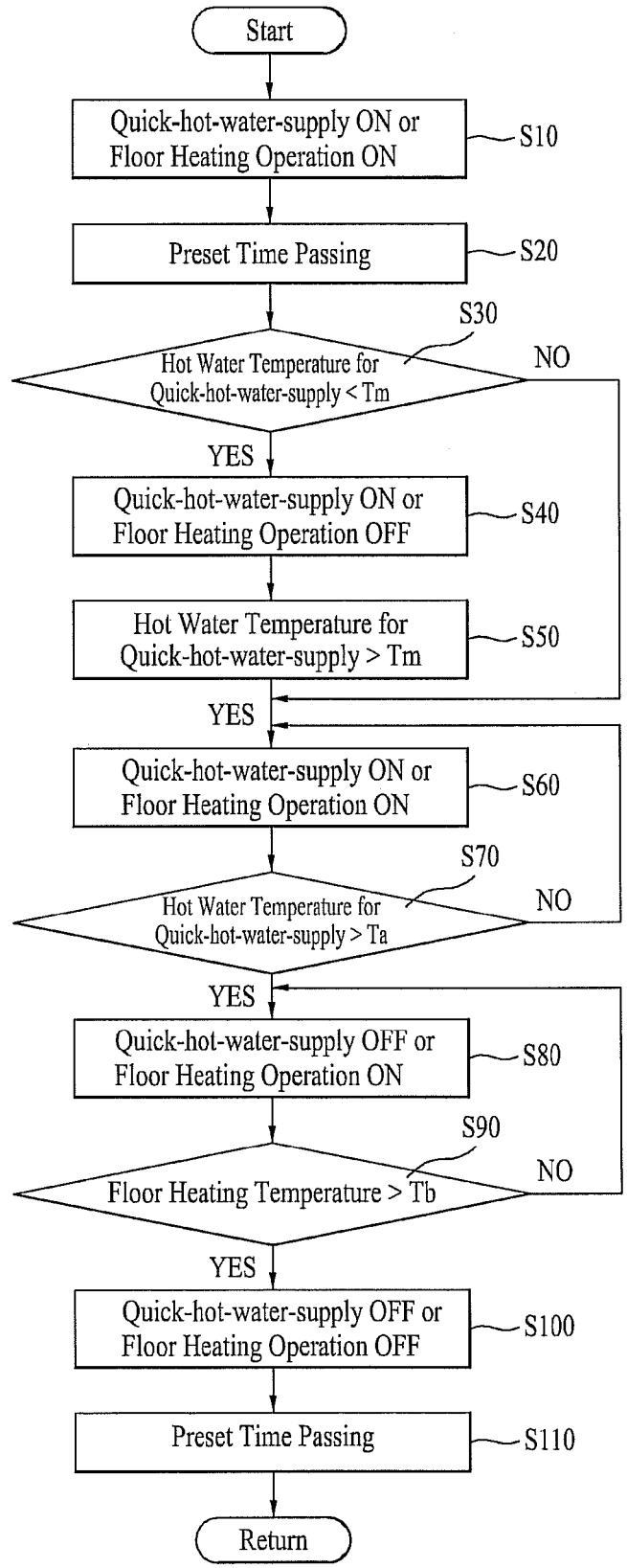
FIG. 7 is a flow chart illustrating a priority of operations based on a quick-hot-water-supply temperature or a floor heating temperature of operation modes that performs quick-hot-water-supply and floor heating of the heat pump according to an embodiment.

FIG. 7 is a flow chart illustrating a priority of operations based on a quick-hot-water-supply temperature or a floor heating temperature of operation modes that perform the quick-hot-water-supply and the floor heating of the heat pump according to embodiments. The operation mode shown in FIG. 7 performs the quick-hot-water-supply operation and the floor heating operation using the heat pump 1000.

When using the quick-hot-water-supply operation and the floor heating function performed by the hydro-unit (H) of the heat pump 1000, it may be assumed that the temperature of the hot water for the quick-hot-water-supply may be increased more rapidly than the temperature of the hot water for the floor heating. Refrigerant compressed in the compressor may be supplied initially to the first heat exchanger for quick-hot-water-supply of the hydro-unit (H). The refrigerant having passed through the first heat exchanger may be thereafter supplied to the second heat exchanger for the floor heating.

The quick-hot-water-supply operation and the floor heating operation may use the heat generated in the condensation process of the compressed refrigerant. A user putting the quick-hot-water-supply operation and the heating operation into operation simultaneously may expect that the temperature of the water for the quick-hot-water-supply will reach a preset or predetermined temperature more rapidly with respect to the temperature of the floor heating.

When the user operates the quick-hot-water-supply operation and the floor heating operation at the same time, in S10, the temperature of the hot-water for the quick-hot-water-supply and the temperature of the floor heating may be increased together by the hydro-unit (H). When it is determined that the temperature of the hot water for the quick-hot-water-supply fails to reach a preset or predetermined quick-hot-water temperature ($T_m$) in step S30, after a preset or predetermined time has passed, in step S20, the floor heating operation may be stopped temporarily, and focus may be put on enhancing the heating ability of the hydro-unit (H), not waiting for the temperature of the hot water for the quick-hot-water-supply to increase slowly. Because of this, only the quick-hot-water-supply operation may be activated and the floor heating operation is stopped temporarily, in step S40.

When it is determined that the temperature of the hot water for the quick-hot-water-supply reaches the preset quick-hot-water temperature ($T_m$), in step S50, after the preset time period has passed, in step S20, the quick-hot-water-supply operation and the floor heating operation may be re-operated, in step S60.

When the temperature of the hot water for the quick-hot-water-supply reaches a preset or predetermined temperature ($T_a$) in a state of performing both the quick-hot-water-supply operation and the floor heating operation, in step S70, the quick-hot-water-supply operation may be stopped, in step S80. When the temperature for the floor heating reaches a preset or predetermined temperature ($T_b$), the floor heating operation may be stopped, in step S100.

Once the preset time has passed, in step S110, the temperature for the quick-hot-water-supply and the temperature for the floor heating may be lowered, to return to step S10 to re-start the quick-hot-water-supply operation and the floor heating operation. As a result, the user may use the quick-hot-water-supply operation and the floor heating operation at the same time using the heat pump 1000 according to embodiments. Also, the temperature of the hot water for the quick-hot-water-supply may be increased rapidly according to the user's request.

Figure 8:
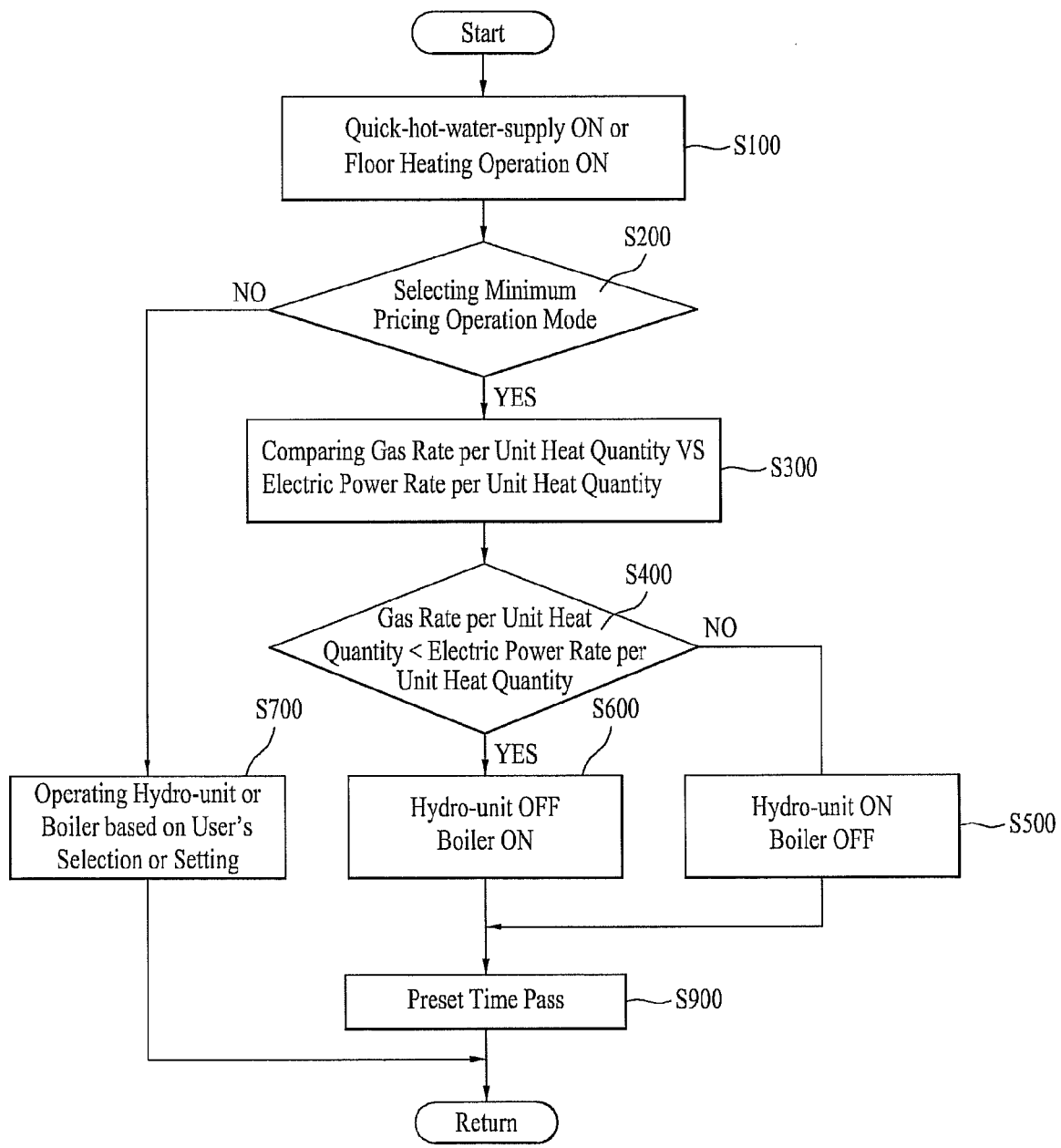
FIG. 8 is a flow chart of a control method for a heat pump according to an embodiment.

FIG. 8 is a flow chart of a control method for a heat pump according to an embodiment. It is assumed that a Smart Grid may be used in environments in which the heat pump 1000 according to embodiments is used.

The Smart Grid may include an electric power station that generates electricity by way of nuclear power or hydroelectric power, and a solar power station and a wind power station which use renewable energy, such as sunlight and wind power, respectively. The electric power station may transmit electricity to an outdoor station via a power cable and the outdoor station may transmit the electricity to a substation. The electricity transmitted to the substation may be distributed to households and offices via electricity storage devices.

In the meanwhile, households using a Home Area Network (HAN) may generate and supply electricity using a fuel cell mounted in a self-solar power generation facility or in a Plug-in Hybrid Electric Vehicle (PGEV), and they may sell any remaining electricity to others. With a smart metering infrastructure, an office or household may recognize the electric power and power rates used therein in real time. Because of this, a user may recognize a current electric power and electric rates, and he or she may take measures to reduce power consumption or power rates depending on the circumstances.

In the meanwhile, the power station(s), outdoor station, storage device, and consuming places may enable duplex transmission. As a result, the consuming places may not receive electricity unilaterally, but rather, may notify their circumstances to other electric power storage device(s), the outdoor station, and the power stations to implement electricity generation and electricity distribution according to their circumstances.

An Energy Management System (EMS) employed for real-time electric power management and real-time power consumption prediction and an Advanced Metering Infrastructure (AMI) for real-time metering of the power consumption may be important in the Smart Grid. The EMS and AMI may be independent devices, or a single device configured to perform the functions of the two devices.

The AMI under a Smart Grid is a basic technology for integrating consumers based on open architecture and the AMI enables consumers to use electricity efficiently and electric power suppliers to manage the system by detecting an error in the system. The term "open architecture" refers to all kinds of electric appliances to be connected to each other in the Smart Grid, regardless of the manufacturers thereof, in comparison to a conventional communication network.

As a result, the metering infrastructure used in the smart grid makes possible consumer-friendly efficiency, such as 'Prices to Devices'. That is, a real-time price signal of the electric power market may be delivered via an EMS installed in each household and the EMS communicates with each electric appliance to control it. As a result, the user recognizes the electric power information of each electric appliance after viewing the EMS, and he or she implements an electric power information process, for example, a power consumption or setting of power-rate limit based on the recognized power information. The EMS may be of a local EMS used in offices or a household and a center or central EMS for processing information acquired by the local EMS.

As real-time communication related to the electric power information between the supplier and the consumer is possible in the Smart Grid, a "real-time Grid response" may be enabled. For example, the power rate may be differentiated based on time periods or a time of the power usage, and a quantity of the power usage may be differentiated in a case that the power rate bill is different based on the power supply company. In addition, a power supplier may adjust the power rate or the power supply based on the response of the consumers.

An electricity supply network system may include a measuring device (i.e. a Smart meter) capable of measuring the electricity supplied to the households and/or the power rate in real time and an energy management system (EMS) connected with a plurality of electric devices, such as electric appliances, to control the operation of the plurality of the electric devices. The EMS may control each of the electric appliances based on power rate information directly, or it may provide only the power rate information to each of the electric appliances. In the latter case, a control part or controller of each electric appliance may generate a control signal for the electric appliance based on the information provided by the EMS.

As a result, the EMS may provide a control part of a heat pump with information on power rate per unit heat quantity at a preset interval, or it may provide the control part with a control signal for the heat pump. The control part of the heat pump may control each of the elements comprising the heat pump based on the transmitted control signal.

The power rate for each of the households may be billed on a pay-by-time system. The power rate may be high in hours having increased power consumption and may be low in hours having relatively less power consumption, such as night hours.

An energy saving mode may reduce the power consumption, and may guide or perform a saving mode, although with hardly any different technical effects from the effects of the mode set by the user.

Under a Smart Grid, the power rate may be differentiated in a period of preset dates, preset weeks, or preset months. In particular, the power rate may be billed differently based on specific hours on a specific date. For example, the power rate may be billed higher in an On Peak Time period, in which power consumption is large, and it may be billed relatively less high in an Off Peak Time period. In addition, under the Smart Grid, the electric power supplier may provide electric power consumers with information on the current power rate billed in each of the periods in real time. The power rate information may be categorized into a schedule information type, which provides the power rate which will be billed after the period to which the current time belongs, or a real time information type, which provides only the power rate billed for the period to which the current time belongs. The former has an advantage of easy expectation of the next power rate, because it provides in advance the information on the power rate billed for the periods after the current time period. It may be difficult to anticipate the power rate after the current time period from the former, because it does not provide the information on the power rate billed after the current time period.

As mentioned above, the Smart Grid may enable two-way communication between the electric power supplier and the electric power consumer. The electric power supplier may monitor the power consumption of the consumer in real time, and it may bill the power rate for the next time flexibly. The electric power consumer may receive the power rate bill in real time, and he or she may postpone a use time of the electric appliance or stop use of the electric appliance as a result. Because of this, the electric power consumer may save power, and the electric power supplier may distribute the electric power more efficiently.

Also, the electric power supplier may transmit the power rate information on the power used by the consumer using various schemes. For example, all of the power rate information per preset hour for a preset time period after a preset time period to which the current time period belongs, or only power rate information per preset hour for the preset time period to which the current time belongs in real time.

In other words, information on the power rate billed in a period of 1 hour or 30 minutes for a specific date, a specific week, or a specific month may be provided in advance. Alternatively, information on the power rate billed for a preset time period to which the current time belongs may be provided in real time.

For example, the electric power supplier may send information on the electric power rate to the electric power consumer, such as a household. The power rate information may be configured variously. In other words, the power rate information may be information on the power rate billed for preset hours of a preset time period after receiving the information, or it may be continuously sent information on the power rate for preset hours in real time. For example, the information on the power rate for the preset hours of the preset time period after the receiving information may refer to the information provided by categorizing the information on the power rate billed for 24 hours after 12 noon, or 12 midnight everyday into time bands of an hour or 30 minutes.

A control part or controller of such an EMS may be integrally provided with an electric appliance. In this case, an auxiliary power supply independent from a power supply of the electric appliance may be provided, and the EMS may be provided with electric power constantly, regardless of the power supplied to the electric appliance via the power supply. In this case, the control part may receive not only the power rate billed for the time period to which the current time belongs, but also the information on the power rate billed for each of prior periods for storage and such.

The heat pump 1000 according to embodiments may use the boiler 700 or the hydro-unit (H) for radiation heating selectively. The hydro-unit (H) may be driven by electricity similar to an air conditioner, and the boiler 700 may be driven by fossil fuels. The fossil fuel used to drive the boiler 700 may be gas.

As mentioned above, under a Smart Grid according to embodiments, the power rate bill may be variable in a period of a specific date, a specific week or a specific month. In particular, the power rate may be varied in specific hours on a specific date. For example, the power rate may be billed high in the On Peak Time period when power consumption is large, and the power rate may be billed relatively less high in the off peak time period when the power consumption is relatively small.

In other words, the Smart Grid according to embodiments may be an environment in which the power rate is varied in real time. The gas rate may not be so sensitive to variation of time, compared with the electric power rate. The gas rate may also be varied in real time.

According to a control method of the heat pump shown in FIG. 8, when the heating operation is performed, the power rate and the gas rate billed to provide the user with the unit quantity of heat may be compared with each other to compare the power rate and the gas rate with each other.

As mentioned above, a household which is a main consumer of the Smart Grid may construct a single electricity supply network system. The electricity supply network system may include a measuring device (i.e., a Smart meter) capable of measuring the electricity supplied to the households and/or the power rate in real time, and the energy management system (E) connected with a plurality of electric devices, such as electric appliances, to control operation the plurality of the electric devices. The power rate may be billed to the household using a pay-by-time system. The power rate may be high in hours having increased power consumption and may be low in hours having relatively less power consumption, such as night hours.

As a result, the EMS (E) provided in each of household may receive information on the electric power rate and/or the gas rate on a pay-by-time basis from an external device. The EMS may provide the heat pump 1000 with the received information on the electric power rate and/or the gas rate per unit heat quantity, or it may directly control the heat pump 1000 according to embodiments.

The EMS (E) may include a display configured to display electricity information and/or external environmental information, an input part or device configured to enable the user to operate the EMS, a communication unit or device configured to transmit and receive information to and from an external device, and a clock control part or controller. Information on the operation mode selectively input by the user or the electric power rate may be stored in the control part. As a result, when the gas rate billed per unit heat quantity is fixed not varied, the user may directly input the gas rate via the input part of the EMS (E).

The plurality of operation modes may be stored in the control part of the heat pump or the hydro-unit such that the user may control one of them to be operated. The plurality of the operation modes may include a minimum pricing based operation mode.

As shown in FIG. 8, when the user starts the quick-hot-water-supply operation and/or the floor heating operation, in step S100, the control part of the EMS or the control part of the heat pump may determine whether to operate the heat pump 1000 in the minimum pricing operation mode based on the user's selection or setting, in step S200. If the operation mode of the heat pump 1000 is the minimum pricing operation mode based on the result of the determination, the control part of the EMS or the control part of the heat pump may compare the electric power rate per unit heat quantity with the gas rate per unit heat quantity, in step S300.

If the electric power rate per unit heat quantity is less high than the gas rate per unit heat quantity, in step S400, based on the result of the determination, the control part of the EMS or the control part of the heat pump may provide the heating function using the hydro-unit (H) of the heat pump 1000, without operating the boiler 700, in step S500. In this case, if the gas rate per unit heat quantity is less high than the electric power rate per unit heat quantity based on the result of the determination, in step S400, the control part of the EMS (E) may stop the operation of the hydro-unit (H) and start the operation of the boiler 700, to provide the heating function, in step S600.

When the user does not select the minimum pricing operation mode, the hydro-unit (H) or the boiler 700 may be operated based on the user's selection or setting to provide the heating function, in step S700. When the user selects the minimum pricing operation mode, the electric power rate may be varied in a period of preset hours. Because of this, when the preset hours passes, in step S900, it may return to the process which performs the comparison between the electric power rate per unit heat quantity and the gas rate per unit heat quantity and the process, in step S300, which may be repeated.

When the user does not select the minimum pricing operation mode, the hydro-unit (H) or the boiler 700 may be operated based on the user's selection or setting, and the heating operation or the quick-hot-water-supply operation may be provided, in step S700. In this case, the control part of the EMS or the control part of the heat pump may operate the hydro-unit (H) or the boiler 700 based on a range of the temperatures ($T_o$) of the external air, as discussed above.

As discussed above, the hydro-unit of the heat pump has the characteristic of drastically deteriorating efficiency, as the temperature ($T_o$) of the external air decreases. Because of this, when the user selects the heating operation, the temperature ($T_o$) of the external air as well as the rate per unit heat quantity may be a variable used to determine which one of the hydro-unit (H) and the boiler 700 is operated. In addition, even when the user desires the heating or quick-hot-water-supply operation and even when considering the efficiency of the hydro-unit (H), the user may not want the cost of the heating or quick-hot-water-supply operation to increase too much. As a result, the user may select a peak pricing operation mode which is different from the minimum pricing operation mode relating to the operation mode shown in FIG. 8. In other words, the peak pricing operation mode may be performed for the gas rate per unit heat quantity or the electric power rate per unit heat quantity, and the efficiency of the hydro-unit (H) may not be higher than a peak rate set by the user.

Figure 9:
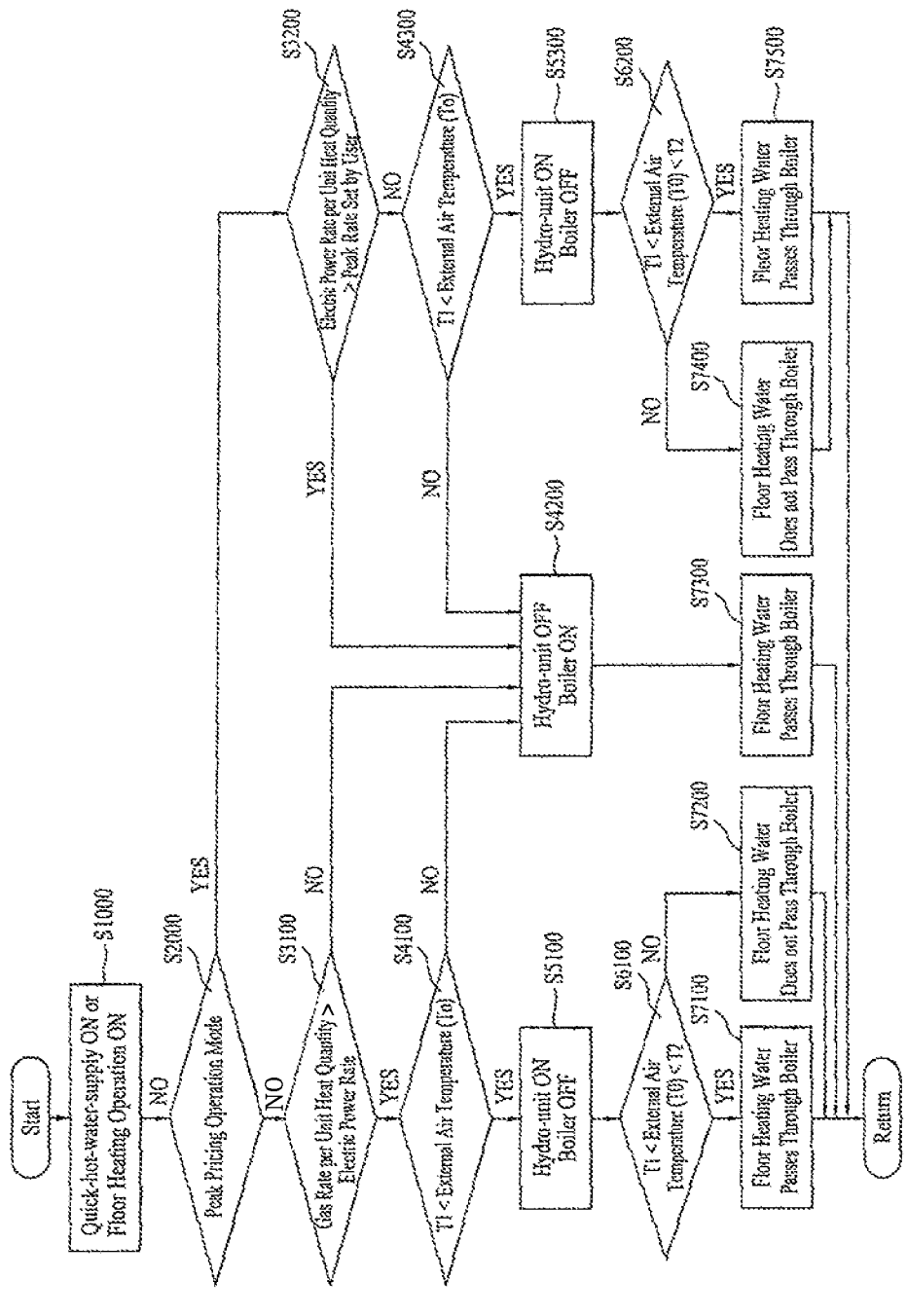
FIG. 9 is a flow chart illustrating a peak pricing operation mode as a control method for a heat pump according to an embodiment.

FIG. 9 illustrates a flow chart illustrating a peak pricing operation mode as a control method for a heat pump according to embodiments.

When the user starts the quick-hot-water-supply operation and or the floor heating operation, in step S1000, the control part or controller of the EMS (E) may determine whether to operate the heat pump in the peak pricing operation mode based on the user's selection or setting, in step S2000. If the operation of the heat pump 1000 is the peak pricing operation mode based on the result of the determination, the control part of the EMS or the control part of the heat pump may determine whether the electric power rate per unit heat quantity is over the peak rate set by the user, in step S3200. In this case, the gas rate per unit heat quantity may be regularly lower than the peak rate set by the user. Even if it is variable, the gas rate per unit heat quantity may be set lower than the peak rate set by the user.

If the electric power rate per unit heat quantity is higher than the peak rate set by the user based on the result of the determination, the boiler 700 may be operated, in step S4200, with the hydro-unit being in standby after its operation is stopped. In contrast, if the electric power rate per unit heat quantity is higher than the peak rate set by the user based on the result of the determination, the temperature of external air ($T_o$) may be compared with the preset or predetermined first temperature ($T_1$) below approximately 0° C., in step S4300.

In this case, even when the electric power rate per unit heat quantity is less than the peak rate set by the user, in the case of the temperature ($T_o$) of the external air being lower than the preset first temperature ($T_1$) below approximately 0° C., the efficiency of the hydro-unit (H) will deteriorate drastically. Because of this, the operation of the hydro-unit (H) may be stopped and the boiler 700 put into operation, in step S4200. When the boiler 600 is operated, heating water used for the floor heating may pass through the boiler 700 necessarily, in step S7300.

In contrast, when the electric power rate per unit heat quantity is less than the peak rate set by the user, with the temperature ($T_o$) of the external air being higher than the preset first temperature ($T_1$) below approximately 0° C., the heating operation and the quick-hot-water-supply operation may be performed by using the hydro-unit (H) and the operation of the boiler 700 may be stopped, in step S5300.

In this case, the control part of the EMS or the control part of the heat pump may compare the temperature ($T_o$) of the external air with the preset second temperature ($T_2$) above approximately 0° C., in step S6200. When the temperature ($T_o$) of the external air is lower than the preset second temperature ($T_2$) above approximately 0° C., the water circulating through the hydro-unit (H) and the radiation heating 600 for the floor heating may be controlled to pass through the boiler 700, in step S7500 even when the boiler 700 is not operated.

However, when the temperature ($T_o$) of the external air is higher than the preset second temperature ($T_2$) above approximately 0° C., there is no danger of freezing and bursting of the boiler 700, and it is not necessary to control the water circulating through the hydro-unit (H) and the radiation heater to pass through the boiler 700, in step S7400.

When the peak pricing operation mode is not selected or set by the user, in step S2000, the control part of the EMS may compare the gas rate per unit heat quantity and the electric power per unit heat quantity with each other, in step S3100. The temperature ($T_o$) of the external air may be compared with the preset first temperature ($T_1$) below approximately 0° C., in step S4100. When the gas rate per unit heat quantity is higher than the electric power rate per unit heat quantity, with the temperature ($T_o$) of the external air being higher than the preset first temperature ($T_1$) below approximately 0° C., the operation of the boiler 700 may be stopped and the hydro-unit (H) operated, in step S5100.

When the temperature ($T_o$) of the external air is lower than the preset first temperature ($T_1$) below approximately 0° C. based on the result of the comparison between the temperature ($T_o$) of the external air and the preset first temperature ($T_1$) below approximately 0° C., the efficiency of the hydro-unit (H) may deteriorate even with the gas rate per unit heat quantity being higher than the electric power. Because of this, the operation of the hydro-unit (H) may be stopped and the boiler 700 operated, in step S4200.

The temperature ($T_0$) of the external air may be compared with the preset second temperature ($T_2$) above approximately 0° C., in step S6100. When the temperature ($T_o$) of the external air is lower than the preset second temperature ($T_2$) above approximately 0° C., the water circulating through the hydro-unit (H) and the radiation heater 600 for the floor heating may be controlled to pass through the boiler 700, in step S7100, even without operating the boiler 700, to prevent the freezing and bursting of the boiler 700. However, when the temperature ($T_o$) of the external air is higher than the preset second temperature ($T_2$) above approximately 0° C., there is no danger of the freezing and bursting of the boiler 700. Because of this, the water circulating through the hydro-unit (H) and the radiation heater 600 for the floor heating may not pass through the boiler 700, step S7200.

Embodiments disclosed herein provide a heat pump that may include an outdoor unit or device including a compressor; a hydro-unit or device including at least one heat exchanger to heat-exchange refrigerant supplied by the outdoor unit with water; a boiler configured to heat water circulating the hydro-unit or water supplied from a commercial water supply system selectively; a quick-hot-water-supply tank configured to heat and store water supplied by the commercial water supply system by using the water heat-exchanged with the refrigerant by the heat exchanger or to store after heating the water supplied by the commercial water supply system by using the boiler; and a control part configured to control the outdoor unit, the hydro-unit, and the boiler. The heat pump may further include a radiation heater part configured to perform heating by using water heated by at least one of the hydro-unit and the boiler. Water circulating the hydro-unit and the radiation heater part selectively may pass the boiler based on the temperature of external air. The refrigerant supplied to the hydro-unit by the outdoor unit may be heat-exchanged with water circulating the hydro-unit and the radiation heater part after heat-exchanged with water circulating the hydro-unit and the quick-hot-water-supply tank. The boiler may be operated when the temperature of the external air is equal to or less than a preset or predetermined first temperature below approximately 0° C., and the hydro-unit may be operated when the temperature of the external air is equal to or more than the first temperature. Water circulating the radiation heater part after being heat-exchanged with refrigerant in the hydro-unit may pass the boiler, when the temperature of the external air is equal to or more than a preset first temperature below approximately 0° C. and equal to or less than a preset or predetermined second temperature above approximately 0° C., which is higher than the first temperature. Only a pump provided in the boiler may be operated without a combustion process.

Water circulating the radiation heater part after being heat-exchanged with refrigerant in the hydro-unit may not pass the boiler, when the temperature of external air is equal to or more than the preset second temperature. Each of the hydro-unit and the boiler may include at least one pump configured to pump heat-exchanged water, and the at least one pump may be operated when the temperature of the external air is equal to or less than a preset second temperature above approximately 0° C. In this case, the first temperature may be equal to or more than approximately −7° C. (7 degrees below zero) and equal to or less than approximately −3° C. (3 degrees below zero), and the second temperature may be equal to or more than approximately 3° C. (approximately 3 degrees above zero) and equal to or less than approximately 7° C. (approximately 7 degrees above zero).

A control part or controller may receive information relating to an electric power rate per unit heat quantity and a gas rate per unit heat quantity. Thereafter, the control part may compare the electric power rate per unit heat quantity with the gas rate per unit heat quantity, and the control part may selectively operate the boiler and the hydro-unit based on the result of the comparison to minimize the rates per unit heat quantity. The control part may stop operation of the hydro-unit and operate the boiler, or the control part may stop the operation of the boiler and operate the hydro-unit, based on the temperature of external air.

The quick-hot-water-supply tank may include a quick-hot-water-supply tank heat exchanger configured to heat-exchange water stored in a storage room of the quick-hot-water-supply tank with the water heat-exchanged with the refrigerant in the hydro-unit. Water supplied to the quick-hot-water-supply tank by a commercial water supply system may be heated via the boiler or by the water heat-exchanged with refrigerant in the quick-hot-water-supply tank heat exchanger after supplied to the quick-hot-water-supply tank.

Embodiments disclosed herein further provide a heat pump that may include an outdoor unit or device including an outdoor heat exchanger and a compressor; a hydro-unit or device including at least one heat exchanger configured to heat-exchange refrigerant supplied by the outdoor unit with water; a boiler configured to heat water circulating the hydro-unit or water supplied by a commercial water supply system selectively; a radiation heater part configured to heat a floor by circulating the water having passed the hydro-unit or the hydro-unit and the boiler; and a control part or controller configured to control the outdoor unit, the hydro-unit and the boiler. A floor supply pipe and a floor collection pipe may be provided to connect the hydro-unit with the radiation heater part, and a boiler supply pipe and a boiler collection pipe which may be branched from the floor supply pipe, may be provided to connect the floor supply pipe with the boiler.

The boiler may include a combustion heating part or heater configured to heat water supplied to the radiation heater part by using combustion heat; and a heat exchange heating part or heater configured to heat water supplied by a commercial water supply by using the water heated by the combustion heating part.

The boiler may be connected with the hydro-unit to be able to communicate with the hydro-unit, and a control signal of the boiler may be transmitted via the hydro-unit. The heat pump may further include a hot water supply pipe configured to supply water to the quick-hot-water-supply tank from the hydro-unit, and a hot water collection pipe configured to collect water in the hydro-unit via the boiler.

The quick-hot-water-supply tank may include a quick-hot-water-supply tank heat exchanger configured to heat-exchange water stored in a storage room of the quick-hot-water-supply tank with the water heat-exchanged with the refrigerant in the hydro-unit. Water supplied to the quick-hot-water-supply tank by a commercial water supply system may be heated via the boiler or by the water heat-exchanged with refrigerant in the quick-hot-water-supply tank heat exchanger after supplied to the quick-hot-water-supply tank.

The heat pump may further include a hot water branched pipe configured to supply water to the quick-hot-water-supply tank heat exchanger of the quick-hot-water-supply tank from the hot water supply pipe, and a hot water collection branched pipe configured to collect water heat-exchanged by the quick-hot-water-supply tank heat exchanger in the hot water collection pipe. In this case, water supplied by the hydro-unit via a hot water supply pipe may be supplied to the quick-hot-water-supply tank heat exchanger of the quick-hot-water-supply tank via the hot water supply branched pipe and water collected by the quick-hot-water-supply tank heat exchanger of the quick-hot-water-supply tank via the hot water collection branched pipe may be collected in the hot water collection pipe, when the temperature of the external air is equal to or more than a preset or predetermined first temperature below approximately 0° C.

A commercial water supply connection pipe may be provided to connect a commercial water supply system with the hot water collection pipe. A commercial water supply pipe branched from the commercial water supply connection pipe may be provided to supply commercial water to an storage room of the quick-hot-water-supply tank. The water supplied by the commercial water supply system may be supplied to the storage room of the quick-hot-water-supply tank via the commercial water supply pipe, when the temperature of the external air is equal to or more than the preset first temperature.

Water collected in the hot water collection pipe may pass the boiler from the hot water collection pipe via a boiler passing pipe passing the boiler. Water supplied by the commercial water supply system may be supplied to the hot water collection pipe via the commercial water supply connection pipe and the boiler may be operated, when the temperature of the external air is equal to or less than a preset first temperature below approximately 0° C.

The boiler may include a combustion heating part or heater configured to heat water supplied to the radiation heater part by using combustion heat, and a heat exchange heating part or heater configured to heat water supplied to the quick-hot-water tank by using the water heated by the combustion heating part. The boiler passing pipe may pass the heat exchange heating part of the boiler.

The control part may be connected to an energy management system configured to provide information on the electric power rate. The energy management system may provide information on the electric power rate per unit heat quantity in a preset period or the energy management system may transmit a control signal of the heat pump to the control part, based on the information on the electric power rate per unit heat quantity.

The control part may compare the electric power rate per unit heat quantity with the gas rate per unit heat quantity, when the energy management system provides the information on the electric power rate per unit heat quantity in the preset period. The control part may stop the operation of the boiler and operate the hydro-unit, when the electric power rate per unit heat quantity is lower than the gas rate per unit heat quantity. The control part may stop the operation of the hydro-unit and operate the boiler, when the gas rate per unit heat quantity is lower than the electric power rate per unit heat quantity.

The heat pump according to embodiments may include the boiler and the quick-hot-water-supply tank, and it may be operated in communication with the boiler selectively based on the electric power rate per unit heat quantity. Further, the heat pump according to embodiments may use the boiler when the temperature of the external air is equal to or less than the preset temperature. As a result, a sufficient heating function or a sufficient quick-hot-water-supply operation.

Still further, in a case that a power grid is a Smart Grid, the heat pump according to embodiments may operate the boiler or the hydro-unit including the heat pump selectively based on the electric power rate per unit heat quantity. As a result, the cost of the heating or quick-hot-water-supply may be minimized.

It will be apparent to those skilled in the art that various modifications and variations can be made in the present application without departing from the spirit or scope of the application. Thus, it is intended that the present application cover the modifications and variations of this application provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A heat pump, comprising:
    an outdoor device comprising a compressor;
    a hydro-device comprising at least one heat exchanger that heat-exchanges refrigerant supplied by the outdoor device with water;
    a boiler configured to selectively heat water circulating through the hydro-device or water supplied from a commercial water supply system;
    a radiation heater configured to perform heating using water heated by at least one of the hydro-device or the boiler, wherein water circulating through the hydro-device and the radiation heater selectively passes through the boiler based on a temperature of external air;
    a quick-hot-water-supply tank configured to heat and store water supplied by the commercial water supply system using the water heat-exchanged with the refrigerant in the hydro-device or to store, after heating, the water supplied by the commercial water supply system; and
    a controller configured to control the outdoor device, the hydro-device, and the boiler, wherein the boiler is operated when the temperature of the external air is less than a predetermined first temperature below approximately 0° C. and the hydro-device is operated when the temperature of the external air is equal to or greater than the predetermined first temperature; wherein when the temperature of the external air is equal to or greater than the predetermined first temperature and less than a predetermined second temperature above approximately 0° C. which is greater than the predetermined first temperature, water circulating through the radiation heater, after being heat-exchanged with the refrigerant in the hydro-device, passes through the boiler and only a pump provided in the boiler is operated, without a combustion process; wherein when the temperature of the external air is equal to or greater than the predetermined second temperature above approximately 0° C., the water circulating through the radiation heater, after being heat-exchanged with the refrigerant in the hydro-device, bypasses the boiler; wherein the controller is connected to an energy management system that provides information on an electric power rate, wherein the energy management system provides information on the electric power rate per unit heat quantity for a predetermined period of time or the energy management system transmits a control signal of the heat pump to the controller, based on the information on the electric power rate per unit heat quantity; wherein when a user sets a peak rate per unit heat quantity using the energy management system or the controller, the energy management system or the controller compares the electric power rate unit heat quantity and a gas rate per unit heat quantity with the set peak rate per unit heat quantity, and the boiler is operated only in a period during which the electric power rate per unit heat quantity is higher than the set peak rate per unit quantity; and wherein operation of the hydro-device is stopped and the boiler operated, when the temperature of the external air is equal to or less than the predetermined first temperature below approximately 0° C., even in a case in which the electric power rate per unit heat quantity is lower than the set peak rate per unit heat quantity.

2. The heat pump as claimed in claim 1, wherein the refrigerant supplied to the hydro-device by the outdoor device is heat-exchanged with water circulating through the radiation heater and the quick-hot-water-supply tank.

3. The heat pump as claimed in claim 2, wherein the hydro-device comprises:
   a first heat exchanger that heat-exchanges the refrigerant supplied by the outdoor device with water circulating through the radiation heater; and
   a second heat exchanger that heat-exchanges the refrigerant supplied by the outdoor device with water circulating through the quick-hot-water-supply-tank.

4. The heat pump as claimed in claim 1, wherein each of the hydro-device and the boiler comprises at least one pump configured to pump heat-exchanged water, and wherein the at least one pump is operated when the temperature of the external air is equal to or less than the predetermined second temperature above approximately 0° C.

5. The heat pump as claimed in claim 1, wherein the quick-hot-water-supply tank comprises a quick-hot-water-supply tank heat exchanger configured to heat-exchange water stored in a storage room of the quick-hot-water-supply tank with the water heat-exchanged with the refrigerant in the hydro-device, and wherein water supplied to the quick-hot-water-supply tank by the commercial water supply system is heated by the boiler or by the water heat-exchanged with the refrigerant in the quick-hot-water-supply tank heat exchanger after being supplied to the quick-hot-water-supply tank.

6. The heat pump as claimed in claim 1, wherein a floor supply pipe and a floor collection pipe connect the hydro-device with the radiation heater, and wherein a boiler supply pipe and a boiler collection pipe which are branched from the floor supply pipe connect the floor supply pipe with the boiler.

7. The heat pump as claimed in claim 6, wherein the boiler comprises:
   a combustion heater configured to heat water supplied to the radiation heater using combustion heat; and
   a heat exchange heater configured to heat water supplied to the quick-hot-water-supply tank using the water heated by the combustion heater.

8. The heat pump as claimed in claim 1, further comprising:
   a hot water supply pipe that supplies water to the quick-hot-water-supply tank from the hydro-device; and
   a hot water collection pipe that collects water in the hydro-device via the boiler.

9. The heat pump as claimed in claim 8, further comprising:
   a hot water supply branched pipe that supplies water to the quick-hot-water-supply tank heat exchanger of the quick-hot-water-supply tank from the hot water supply pipe; and
   a hot water collection branched pipe that collects water. heat-exchanged by the quick-hot-water-supply tank heat exchanger in the hot water collection pipe.

10. The heat pump as claimed in claim 9, wherein water supplied by the hydro-device via the hot water supply pipe is supplied to the quick-hot-water-supply tank heat exchanger of the quick-hot-water-supply tank via the hot water supply branched pipe, and wherein water collected from the quick-hot-water-supply tank heat exchanger of the quick-hot-water-supply tank via the hot water collection branched pipe is collected in the hot water collection pipe, when the temperature of the external air is equal to or greater than the predetermined first temperature below approximately 0° C.

11. The heat pump as claimed in claim 8, wherein a commercial water supply connection pipe connects the commercial water supply system with the hot water collection pipe, and wherein a commercial water supply pipe branched from the commercial water supply connection pipe supplies the water supplied by the commercial water supply system to a storage room of the quick-hot-water-supply tank.

12. The heat pump as claimed in claim 11, wherein the water supplied by the commercial water supply system is supplied to the storage room of the quick-hot-water-supply tank via the commercial water supply connection pipe when the temperature of the external air is equal to or greater than the predetermined first temperature.

13. The heat pump as claimed in claim 12, wherein water collected in the hot water collection pipe passes through the boiler via a boiler passing pipe.

14. The heat pump as claimed in claim 13, wherein the boiler comprises:
   a combustion heater configured to heat water supplied to the radiation heater using combustion heat; and
   a heat exchange heater configured to heat water supplied to the quick-hot-water-supply tank using the water heated by the combustion heater.

15. The heat pump as claimed in claim 11, wherein when the temperature of the external air is equal to or less than the predetermined first temperature below approximately 0° C., the water supplied by the commercial water supply system is supplied to the hot water collection pipe via the commercial water supply connection pipe and the boiler is operated.

16. The heat pump as claimed in claim 1, wherein the controller compares the electric power rate per unit heat quantity with a gas rate per unit heat quantity, when the energy management system provides the information on the electric power rate per unit heat quantity for the predetermined period of time, wherein the controller stops operation of the boiler and operates the hydro-device, when the electric power rate per unit heat quantity is lower than the gas rate per unit heat quantity, and wherein the controller stops operation of the hydro-device and operates the boiler, when the gas rate per unit heat quantity is lower than the electric power rate per unit heat quantity.

17. The heat pump as claimed in claim 1, further comprising an indoor device comprising a compressor, wherein, in addition to the outdoor device, the indoor device supplies refrigerant to the hydro-device, which is heat-exchanged with water circulating through the quick-hot-water-supply tank.

* * * * *